US011417183B1

(12) United States Patent
Onofrio et al.

(10) Patent No.: US 11,417,183 B1
(45) Date of Patent: Aug. 16, 2022

(54) CABLE-FREE GUNSHOT DETECTION

(71) Applicant: Shooter Detection Systems, LLC, Newburyport, MA (US)

(72) Inventors: Richard Thomas Onofrio, Arlington, MA (US); Ronald A Fowler, Westford, MA (US)

(73) Assignee: Shooter Detection Systems, LLC, Newburyport, MA (US)

( * ) Notice: Subject to any disclaimer, the term of this patent is extended or adjusted under 35 U.S.C. 154(b) by 289 days.

(21) Appl. No.: 16/454,148

(22) Filed: Jun. 27, 2019

Related U.S. Application Data

(63) Continuation-in-part of application No. 15/684,925, filed on Aug. 23, 2017, now Pat. No. 10,657,800.
(Continued)

(51) Int. Cl.
G08B 13/16 (2006.01)
G08B 25/10 (2006.01)
G08B 13/19 (2006.01)

(52) U.S. Cl.
CPC ......... *G08B 13/1672* (2013.01); *G08B 13/19* (2013.01); *G08B 25/10* (2013.01)

(58) Field of Classification Search
CPC ..... G08B 13/1672; G08B 25/10; G08B 13/19
See application file for complete search history.

(56) References Cited

U.S. PATENT DOCUMENTS 5,930,202 A   7/1999  Duckworth et al.
5,970,024 A * 10/1999  Smith ..................... F41H 11/00
                                                    367/128
(Continued)

FOREIGN PATENT DOCUMENTS

WO     WO0073811 A1    12/2000
WO     WO2009046367 A1  4/2009
(Continued)

OTHER PUBLICATIONS

Duckworth et al.,Fixed and wearable acoustic counter-sniper systems for law enforcement, Jan. 1999 (Year: 1999).*
(Continued)

*Primary Examiner* — Daniel Pihulic
(74) *Attorney, Agent, or Firm* — Adams Intellex, PLC

(57) ABSTRACT

Techniques for cable-free indoor gunshot detection are disclosed. Acoustic information is collected within an indoor environment using a gunshot sensor device which uses cable-free communication to a network. The gunshot sensor device is powered by a battery. Infrared information from the muzzle flash of a firearm is collected using the gunshot sensor device. The infrared information is buffered within the gunshot sensor device. The gunshot sensor device is used to monitor the acoustic information and identify a high-intensity gunshot sound. The gunshot sensor device is used to match the high-intensity gunshot sound to the buffered infrared information. The matching includes making a correspondence between the gunshot sound and an infrared event that occurred in time before the gunshot sound. The gunshot sensor device is used to notify the network of a possible gunshot occurrence, based on an analysis of the high-intensity gunshot sound and the infrared event that was matched.

23 Claims, 16 Drawing Sheets

Related U.S. Application Data

(60) Provisional application No. 62/691,135, filed on Jun. 28, 2018, provisional application No. 62/429,754, filed on Dec. 3, 2016, provisional application No. 62/379,023, filed on Aug. 24, 2016.

(56) References Cited

U.S. PATENT DOCUMENTS

| | | | |
|---|---|---|---|
| 6,178,141 | B1 | 1/2001 | Duckworth et al. |
| 6,847,587 | B2 | 1/2005 | Patterson et al. |
| 7,203,132 | B2 | 4/2007 | Berger |
| 7,266,045 | B2 | 9/2007 | Baxter et al. |
| 7,411,865 | B2 | 8/2008 | Calhoun |
| 7,474,589 | B2 | 1/2009 | Showen et al. |
| 7,532,542 | B2 | 5/2009 | Baxter et al. |
| 7,586,812 | B2 | 9/2009 | Baxter et al. |
| 7,599,252 | B2 | 10/2009 | Showen et al. |
| 7,602,329 | B2 | 10/2009 | Manderville et al. |
| 7,688,679 | B2 | 3/2010 | Baxter et al. |
| 7,710,278 | B2 | 5/2010 | Holmes et al. |
| 7,719,428 | B2 | 5/2010 | Fisher et al. |
| 7,750,814 | B2 | 7/2010 | Fisher et al. |
| 7,751,282 | B2 | 7/2010 | Holmes et al. |
| 7,755,495 | B2 | 7/2010 | Baxter et al. |
| 7,796,470 | B1 | 9/2010 | Lauder et al. |
| 7,855,935 | B1 | 12/2010 | Lauder et al. |
| 7,961,550 | B2 | 6/2011 | Calhoun |
| 8,036,065 | B2 | 10/2011 | Baxter et al. |
| 8,063,773 | B2 | 11/2011 | Fisher et al. |
| 8,134,889 | B1 | 3/2012 | Showen et al. |
| 8,325,562 | B2 | 12/2012 | Showen |
| 8,325,563 | B2 | 12/2012 | Calhoun et al. |
| 8,351,297 | B2 | 1/2013 | Lauder et al. |
| 8,369,184 | B2 | 2/2013 | Calhoun |
| 8,478,319 | B2 | 7/2013 | Azimi-Sadjadi et al. |
| 8,995,227 | B1 | 3/2015 | Johnson |
| 9,240,114 | B2 | 1/2016 | Showen et al. |
| 10,586,109 | B1 * | 3/2020 | Fowler ............... G01J 5/10 |
| 10,657,800 | B1 * | 5/2020 | Fowler ............... G01S 3/803 |
| 10,830,866 | B1 * | 11/2020 | Onofrio ............... G01S 5/18 |
| 2004/0100868 | A1 | 5/2004 | Patterson, Jr. et al. |
| 2008/0219100 | A1 | 9/2008 | Fisher et al. |
| 2010/0058947 | A1 | 3/2010 | Davis et al. |
| 2010/0278013 | A1 | 11/2010 | Holmes et al. |
| 2012/0300587 | A1 | 11/2012 | Azimi-Sadjadi et al. |
| 2014/0361886 | A1 | 12/2014 | Cowdry |
| 2015/0070166 | A1 | 3/2015 | Boyden et al. |
| 2015/0071038 | A1 | 3/2015 | Boyden et al. |
| 2015/0177363 | A1 | 6/2015 | Hermann et al. |
| 2015/0268170 | A1 | 9/2015 | Scott et al. |
| 2015/0347902 | A1 | 12/2015 | Butler, Jr. et al. |
| 2016/0086472 | A1 | 3/2016 | Herrera et al. |
| 2016/0133107 | A1 | 5/2016 | Showen et al. |
| 2016/0225242 | A1 | 8/2016 | Kane et al. |
| 2016/0232774 | A1 | 8/2016 | Noland et al. |
| 2016/0260307 | A1 | 9/2016 | Skorpik et al. |
| 2017/0123038 | A1 | 5/2017 | Griggs et al. |
| 2017/0169686 | A1 | 6/2017 | Skorpik et al. |

FOREIGN PATENT DOCUMENTS

| | | |
|---|---|---|
| WO | WO2009048500 A2 | 4/2009 |
| WO | WO2009085361 A2 | 7/2009 |
| WO | WO2010039130 A1 | 4/2010 |
| WO | WO2010085822 A2 | 7/2010 |
| WO | WO2012103153 A2 | 8/2012 |
| WO | WO2014070174 A1 | 5/2014 |
| WO | WO2014165459 A2 | 10/2014 |

OTHER PUBLICATIONS

González-Castano, Francisco Javier, et al. "Acoustic sensor planning for gunshot location in national parks: A pareto front approach." Sensors 9.12 (2009): 9493-9512.

* cited by examiner

CABLE-FREE GUNSHOT DETECTION

RELATED APPLICATIONS

This application claims the benefit of U.S. provisional patent application "Cable-free Gunshot Detection" Ser. No. 62/691,135, filed Jun. 28, 2018.

This application is also a continuation-in-part of U.S. patent application "Gunshot Detection within an Indoor Environment" Ser. No. 15/684,925, filed Aug. 23, 2017, which claims the benefit of U.S. provisional patent applications "Gunshot Detection within an Indoor Environment" Ser. No. 62/379,023, filed Aug. 24, 2016, and "Testing of Gunshot Sensors" Ser. No. 62/429,754, filed Dec. 3, 2016.

FIELD OF ART

This application relates generally to gunshot analysis and more particularly to cable-free indoor gunshot detection.

BACKGROUND

Gun violence has become a widely publicized issue in recent years, with some people arguing it has become a public health emergency. According to recent statistics, one in three people in the United States knows someone who has been shot. On average, 31 Americans are murdered with guns every day and 151 are treated for a gun assault in an emergency room. In 2015 alone, more than 12,000 people were killed in the United States by a gun, and many others were injured. Gun violence has unfortunately occurred in a variety of public places, such as schools, places of worship, sporting event venues, nightclubs, and airports. While the use of metal detectors, body scanners, and other security measures such as physical searches are frequently employed in an attempt to prohibit and exclude firearms from such venues, incidents of gun violence in public places continue to be a major issue.

Gunshot detection by electronic devices, rather than by humans, is performed for a variety of purposes and applications that include the military, law enforcement, security, and public safety. Gunshot detection is a complex task because of the sheer variety of weapons and explosive devices that can produce the gunshot event. Identifying the point of origin of the gunshot is essential to quickly identifying and tracking a suspected shooter. The identification of the source of the gunshot is complicated by many factors including the spatial environment in which the gunshot event occurs. Gunshot detection and shooter identification are critical elements in many military, law enforcement, security, and public safety scenarios.

Some early work in detecting gunshots in an outdoor setting involved using several microphones spread out over a large distance. A gunshot is often sufficiently loud that it can be heard many thousands of feet away in an outdoor setting. The occurrence of a gunshot would then register on the microphones, but at slightly different times. Even at the same microphone, a gunshot could be registered at slightly different times due to echoes. For example, the speed of sound in dry air at sea level at 68° Fahrenheit is about 1125 feet/second, and a gunshot that occurs somewhere between two microphones that are situated 2500 feet apart would be detected at the microphones one or even two seconds apart, which is an easily detectable difference. Furthermore, the relative times of detection are an indication of the proximity of the gunshot to one microphone versus another microphone. Unfortunately, this scheme cannot distinguish between gunshots and other similar explosive sounds, such as car backfires, construction noises, fireworks, etc.

The problem of gunshot detection indoors is many times more complicated than gunshot detection outdoors. In indoor settings, many different factors can complicate accurate gunshot detection. For example, in an indoor setting, the probability of extensive sound reverberations and echoes from the initial gunshot is very high. In addition, rooms within the indoor setting often have convoluted acoustic pathways. These acoustic pathways are often blocked by closed doors, which cause many decibels of sound attenuation. Furthermore, indoor settings are often spread over multiple floors and can be replete with crowds of people, which makes dealing with indoor gunshots extremely challenging for law enforcement officers or other public safety personnel. Additionally, many other distracting sonic and visual interferences may be present in a crowded, indoor environment, including screams, flashlights, police alarms, building alarms, fire alarms, earthquake alarms, tornado alarms, and the like. Even with these complicating factors, gunshot detection in an indoor environment is an important element of public safety.

SUMMARY

Gun violence continues to adversely affect society in indoor venues such as schools, places of worship, sporting events, nightclubs, and airports. External environmental factors such as sirens and lights from fire alarms, or loud music and flashing lights in nightclubs, can cause challenges for indoor gunshot detection. Disclosed embodiments provide techniques that utilize one or more position-independent gunshot sensor devices. Embodiments provide a processor-implemented method for gunshot analysis. The method can include collecting acoustic information within an indoor environment using a gunshot sensor device. The gunshot sensor device can use cable-free communication to a network. The gunshot sensor device is powered by a battery. The method can include collecting infrared information within the indoor environment using the gunshot sensor device. The infrared information can be buffered within the gunshot sensor device. The method can include monitoring, using the gunshot sensor device, the acoustic information to identify a high-intensity gunshot sound. The method can include matching, using the gunshot sensor device, the high-intensity gunshot sound to the infrared information that was buffered. The matching can include making a correspondence between the gunshot sound and an infrared event that occurred in time before the gunshot sound. The method can include notifying, using the gunshot sensor device, the network of a possible gunshot occurrence. The notifying can be based on an analysis of the high-intensity gunshot sound and the infrared event that was matched. Thus, the disclosed embodiments are configured to minimize false-positives due to external environmental factors.

A processor-implemented method for gunshot analysis is disclosed comprising: collecting acoustic information within an indoor environment using a gunshot sensor device, wherein the gunshot sensor device uses cable-free communication to a network and wherein the gunshot sensor device is powered by a battery; collecting infrared information within the indoor environment using the gunshot sensor device, wherein the infrared information is buffered within the gunshot sensor device; monitoring, using the gunshot sensor device, the acoustic information to identify a high-intensity gunshot sound; matching, using the gunshot sensor device, the high-intensity gunshot sound to the infrared information that was buffered, wherein the matching includes making a correspondence between the gunshot sound and an infrared event that occurred in time before the gunshot sound; and notifying, using the gunshot sensor device, the network, of a possible gunshot occurrence, wherein the notifying is based on an analysis of the high-intensity gunshot sound and the infrared event that was matched.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
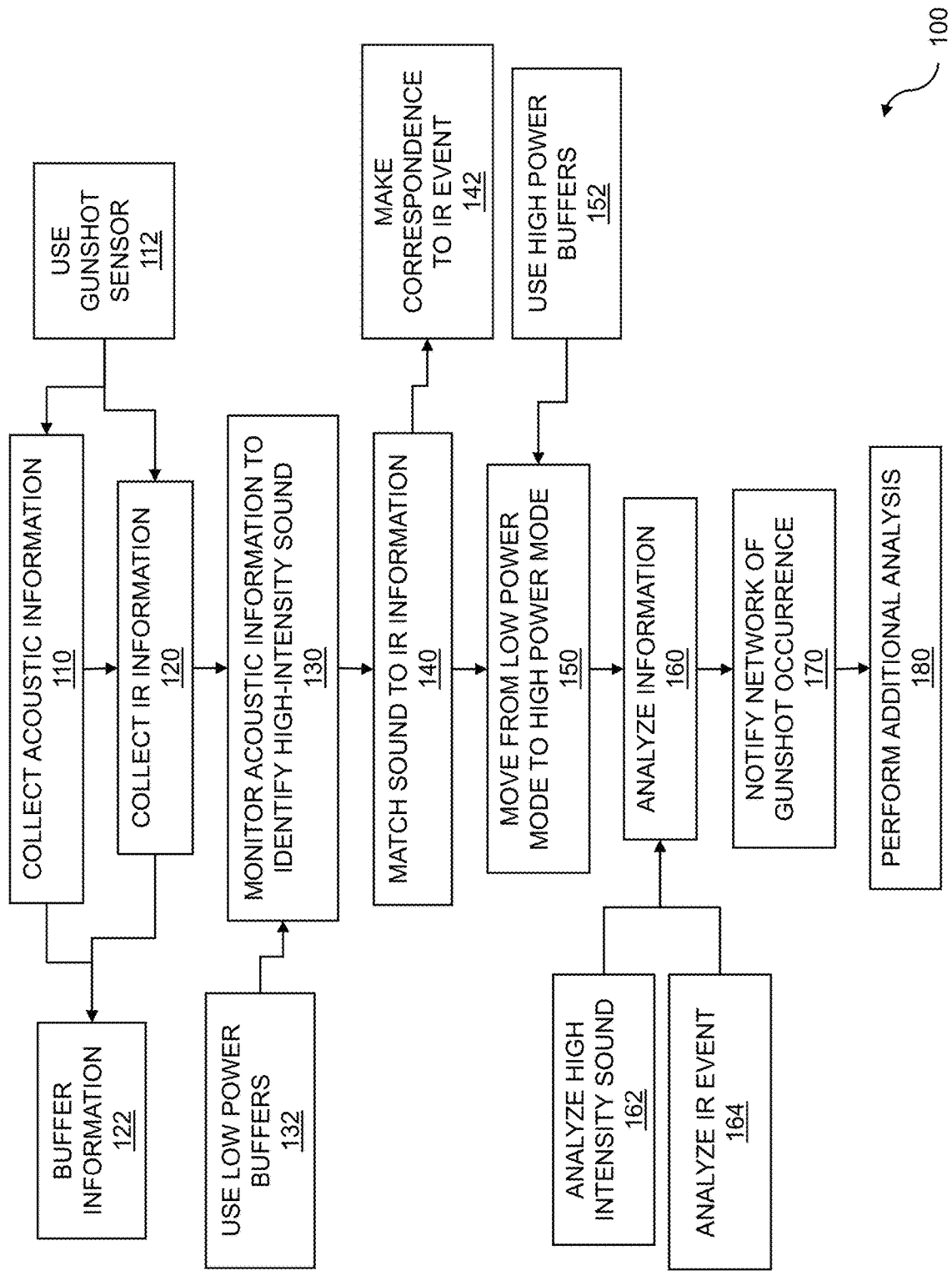
FIG. 1 is a flow diagram for cable-free indoor gunshot detection.

Techniques for detection of gunshots within an indoor environment are described herein. The safety and security of building occupants render crucial the need to accurately and quickly identify true gunshots while at the same time eliminating any false alerts. The gunshots can be identified by their corresponding muzzle flashes and loud acoustic signatures. To detect gunshot occurrences, a gunshot sensor device can be situated in an indoor environment. The gunshot sensor device can include multiple individual sensors, including, but not limited to, an acoustic sensor or an infrared (IR) sensor. The acoustic sensor can detect the acoustic pressure wave that is typically emitted by a firearm when it is fired. Additionally, a firearm typically emits energy within the infrared spectrum when fired. Thus, by detecting the infrared emission coincidental with a detected acoustic pressure wave, a presumption of a gunshot can be inferred. The acoustic sensor can be configured to detect the initial pressure wave emitted from a firearm. In essence, the acoustic sensor can only detect very loud, sudden bursts of acoustic energy associated with a gunshot, such as shock waves and/or loud blasts. Other high sound pressure level (SPL) sounds, such as loud music, slamming doors, and shouting voices do not generally trigger the acoustic pressure sensor. The infrared sensor, however, can be fooled by such IR sources as the strobe light often associated with a fire alarm or other alarm, thus triggering infrared sensor activation.

Thus, disclosed sensors provide numerous advantages. One such advantage is a legal benefit in that the acoustic sensor does not record voices as a traditional microphone would. This maintains privacy and confidentiality within the indoor environment, as the acoustic sensor does not pick up conversations, lectures, or other verbal events that might be transpiring in the environment. Another key advantage is that the acoustic sensor is configured to detect the primary acoustic wave from the firearm, but is unlikely to pick up reverberations and echoes from reflected sound waves. Since these secondary acoustic waves that may reverberate off walls and other surfaces in the indoor environment are mostly ignored by the acoustic sensor, it facilitates a position-independent gunshot sensor. There is no need for special calibrations in a given indoor environment. The elimination of calibration is particularly advantageous in large indoor environments such as schools, airports, gymnasiums, and sporting arenas. Thus, the analyzing can be accomplished without tuning the gunshot sensor for the indoor environment in which the gunshot sensor resides. (The tuning requirements differ within a room when the room is empty or full.) Furthermore, the analyzing can provide a distance from the shooter to the sensor. In some environments, multiple gunshot sensors can be used. The installation of the gunshot detection system in these indoor environments is straightforward and time-efficient because there is no need to specifically select a particular position within the indoor environment, nor is there a need for any pre-use calibration. These capabilities enable the disclosed systems to be quickly and efficiently installed in indoor environments, providing the desired gunshot detection in important transportation venues, entertainment venues, hospitals, and other large, public, indoor environments.

In some configurations, multiple gunshot sensors are used. The multiple sensors are connected to a gateway device that receives feedback from the gunshot sensors and can report the data upstream to a monitoring system, emergency warning system, or another suitable system. In some configurations, the gunshot sensor can further include a video camera and a microphone. The microphone can be connected to a pickup circuit with its gain set such that the microphone only picks up very loud noises (e.g. 110-130 decibels or greater), such as a muzzle blast, and does not pick up ordinary conversation. In some embodiments, a lower decibel threshold is set to enable detection of acoustically suppressed or lower caliber weapons. In some embodiments, a video management system is integrated and enabled to provide various notification services. In some embodiments, the video camera and microphone are only activated after a gunshot detector detects a possible gunshot. Thus, if a gunshot is detected in the indoor environment, the microphone and video camera can be activated to attempt to record audio and video of the scene and possibly to record audio and video of the suspect(s) who fired the gunshot. In such embodiments, the gunshot sensor enters a surveillance mode once a gunshot has been detected, and the gain of the microphone circuit can be adjusted to pick up additional sounds. The recorded audio and video information can be of tactical importance to law enforcement so that they can better understand the extent of injuries and casualties, as well as to assess the number of shooters on the scene.

Another challenge of gunshot detection in an indoor environment is the various external environmental factors that can occur in temporal proximity to a gunshot. For example, a fire alarm can create both a very loud noise and a flashing strobe. In a nightclub, music can be very loud, and there might be a multitude of strobes and other flashing lights. Disclosed systems can accommodate such environmental factors and still provide effective gunshot detection with one or more position-independent gunshot sensors placed within an indoor environment, thus enabling effective and efficient gunshot monitoring, and improving public safety.

A typical firearm discharge involves various phenomena. There is a muzzle flash, which emits visible and infrared light. A muzzle flash typically comprises multiple phases, which include a primary flash, an intermediate flash, and a secondary flash. The primary flash results as hot, highly compressed gases, which are the unburned propellants, exit the barrel along with the projectile. These gases expand rapidly, not mixing with the atmosphere, then rebound. This creates a high-temperature region that produces the intermediate flash. As oxygen mixes with the unburned propellants, ignition occurs, causing the secondary flash. A majority of the radiated energy corresponding to the muzzle flash occurs during the secondary flash, and most of the total radiated energy is in the infrared (IR) region. This is in contrast to other environmental factors within an indoor environment, such as fire alarm strobes. The light emitted by a fire alarm strobe is mostly in the visible spectrum, with a much lower IR component. Thus, detecting IR energy is an important aspect of gunshot detection.

A shock wave following a gunshot occurrence can also occur, which is caused by the supersonic travel of the projectile/bullet. A supersonic bullet causes a distinctive shock wave pattern as it moves through the air. The shock wave expands as a cone behind the bullet, with the wave front propagating outward at the speed of sound. As the shock wave propagates, the nonlinear behavior of the air causes the pressure disturbance to form an "N" shape with a rapid onset, a ramp to the minimum pressure, and then an abrupt offset. Most events within an indoor environment do not cause a shock wave. For example, a door slamming, while perceived as loud to someone within its hearing, does not cause a shock wave such as that which would result from supersonic travel of a projectile. Thus, detection of a shock wave can be an important factor in gunshot detection. However, shock waves are largely dependent on the orientation of projectile motion. Hence, the direction of the gunshot in relation to the gunshot detector can affect the magnitude of the detected shock wave. Furthermore, there can be a muzzle blast, which is the sound caused by the discharge of the firearm. A typical firearm uses a confined explosive charge to push the bullet out of the gun barrel. The hot, rapidly expanding gases cause a muzzle blast to emerge from the barrel. The acoustic disturbance can have a duration in the range of 3 to 5 milliseconds and can propagate through the air at the speed of sound.

FIG. 1 is a flow diagram for cable free indoor gunshot detection. The flow 100 includes collecting acoustic information 110 within an indoor environment using a gunshot sensor device 112. The acoustic information that is collected can include high sound pressure level (SPL) sounds such as a high-intensity gunshot sound, low SPL sounds such as conversations, shouts, or other sounds including human-generated sounds, and so on. The acoustic information can selectively include high SPL or low SPL sounds. The acoustic information can include detection of a shock wave and/or a sound wave. The shock wave and/or the sound wave are detected with an acoustic sensor. The shock wave emanates from the projectile as it travels through the air at supersonic speeds. The acoustic information can include the sound wave from the gun itself. The sound wave may be detected by a microphone that is coupled to a pickup circuit with its gain configured to detect only very loud sounds (e.g. 110-130 decibels or greater). In embodiments, the acoustic information includes only the sound wave from the gun itself. In this case, the shock wave could have been attenuated, missing, or otherwise misdirected such that it is not included and not necessary or required to detect and confirm the gunshot. Shock waves are typically formed due to events such as supersonic travel of a projectile, or a nearby lightning strike. The sound wave is a loud sound emitted from the firearm upon discharge. Other factors in an indoor environment can also cause loud sounds, such as fire alarms, doors slamming, books dropping, and the like.

The flow 100 further includes buffering the acoustic information. The acoustic information can be buffered for storage, retiming, analysis, signature matching, filtering, and so on. In embodiments, the acoustic information that is buffered can use a low-power buffer and a high-power buffer. The low-power buffer can be used to conserve energy from a source such as a battery. The high-power buffer can be used when fast access to data such as acoustic information is required. In some embodiments, the low-power buffer and the high-power buffer are the same buffer operating in two or more different power modes. In general, the high-power buffer or buffer mode will contain more data (longer sampling time), retain it for a longer period of time, and provide faster data access than the low-power buffer or buffer mode. In embodiments, the low-power buffer can be a pre-trigger event buffer and the high-power mode can be a post-trigger event buffer, where the trigger is the point at which a suspected gunshot is detected. For example, the low-power buffer can be integrated inside a processing device and the high-power buffer can be a standalone buffering device. Low- and high-power buffering can also be applied to IR information.

In embodiments, the low-power acoustic information buffer can enable gunshot event detection. Acoustic information that can be collected using the gunshot sensor device can be stored in the low-power buffer from which it can be analyzed to detect a gunshot event. A gunshot event can include a high SPL signal such as a high-intensity gunshot sound. In other embodiments, the high-power acoustic information buffer can enable spurious information filtering. Filtering of spurious information can include filtering out of periodic acoustic sources such as a klaxon from a fire alarm, alerts from other alarms such as a siren, a bell, or a buzzer, and so on.

The gunshot sensor device can include a housing that can be mounted to a wall, a ceiling, a partition, a post, a divider, and so on, within an indoor environment. The gunshot sensor device uses cable-free communication to a network. The cable-free communication to a network can include a wireless communication technique such as Wi-Fi, Bluetooth™, Zigbee™, Low Power Wide Area Network (LP-WAN), and so on, for short-range or medium-range exchange of information, control information, etc. The network can include a computer network such as the Internet, a wide area network (WAN), a local area network (LAN), a purpose-built network, and the like. The gunshot sensor device can be powered by a battery. The battery can include a rechargeable battery, a non-chargeable battery, a single-use battery, etc. A rechargeable battery can be recharged using a solar cell, a trickle charger, and the like. In embodiments, the battery of the gunshot sensor device occupies less than 10 cubic inches of volume. The battery can be located outside of the gunshot sensor device housing, adjacent to the housing, etc. In embodiments, the gunshot sensor device and the battery can be co-located in one housing.

The flow 100 includes collecting infrared (IR) information 120 within the indoor environment using the gunshot sensor device 112. In embodiments, the collected infrared information comprises energy at near-infrared wavelengths such as those ranging from 0.78-3.0 microns. The infrared information that is collected can include a high-intensity IR signal such as a flash of light off a reflective surface, a muzzle flash, a spectral signature, and so on. In embodiments, a spectral signature can be identified and can include specifics for light emitted such as that seen in near-infrared wavelengths. The duration may vary depending on the firearm from less than 1 to 7 milliseconds. In embodiments, the duration is up to 7.5 milliseconds. In embodiments, the infrared information is buffered 122 within the gunshot sensor device. The buffered IR information can be stored for analysis, comparison, confirmation, corroboration, and the like. In embodiments, the infrared information that is buffered can use a low-power infrared information buffer and a high-power infrared information buffer. The low-power IR information buffer can be used to conserve battery power, while the high-power IR information buffer can be used when faster data access is required. The low-power IR information buffer and the high-power IR information buffer can be used for various gunshot detection purposes. In embodiments, the low-power infrared information buffer can enable gunshot event confirmation, as will be discussed shortly. In other embodiments, the high-power infrared information buffer can enable spurious infrared information filtering. Spurious IR information can include flashes of light off shiny surfaces, natural sources such as lightning, bleed-over from strobes for alerts or alarms, etc.

The flow 100 includes monitoring the acoustic information, using the gunshot sensor device, to identify a high-intensity gunshot sound 130. The monitoring can include scanning the acoustic data that is collected for acoustic information with one or more characteristics. The characteristics can include a high amplitude, or SPL; a duration; a signature; an envelope; and so on. The monitoring can be performed by the gunshot sensor device based on a schedule such as a monitoring mode for operating hours of a school, and a different monitoring mode for after-hours. The monitoring can include monitoring for an anomaly in the acoustic information such as a signal with a magnitude or SPL in excess of a nominal level, an average level, a running average level, and so on. In embodiments, the collecting and the monitoring can include a low-power mode of the gunshot sensor device. The monitoring can be performed continuously; in order to conserve battery power of the battery powering the gunshot sensor device, the gunshot sensor device can be operated in a low power mode. As discussed elsewhere, the acoustic information can be buffered. In embodiments, the acoustic information that is buffered uses a low-power buffer 132.

The flow 100 includes matching, using the gunshot sensor device, the high-intensity gunshot sound to the infrared information 140 that was buffered. A gunshot occurrence can include acoustic components such as a muzzle blast, a shock wave, and the like. The gunshot occurrence can also include infrared components such as a muzzle flash. A gunshot sensor device may collect acoustic information, infrared information, or both. The matching includes making a correspondence 142 between the gunshot sound and an infrared event that occurred in time before the gunshot sound. Since light travels faster than sound, in air and other media, the muzzle flash information can be detected sooner than the muzzle blast, shock wave, etc. Making the correspondence between the IR components and the acoustic components can be based on an amount of time between the collecting of the IR information and the collecting of the acoustic information. The amount of time can include a window, a tolerance, a margin, etc. In embodiments, the matching can include a medium-power mode of the gunshot sensor device.

The flow 100 includes moving from the low-power mode to a higher power mode 150 to facilitate cable-free communication to the network. The moving from the low-power mode to a higher power mode can include waking or enabling a processor to perform analysis and other operations, increasing processor clock speed, enabling other gunshot sensor device components, enabling transceivers or radios for cable-free communication, etc. The moving from low-power mode to high-power mode can include controlling buffers. The high-power buffers 152 can be used for various techniques such as filtering. In embodiments, the high-power infrared information buffer can enable spurious infrared information filtering, such as filtering out strobes, flashing lights, or other alerts. The gunshot sensor device can filter high-intensity infrared information from an ongoing fire alarm strobe light. While the fire alarm strobe light can generate visible light, the light emitted by the strobe can bleed over into IR. In other embodiments, the high-power acoustic information buffer enables spurious information filtering, such as filtering out klaxons, buzzers, bells, or other alerts.

The flow 100 includes analyzing both the acoustic information and the infrared information 160. This evaluation can include analyzing a high-intensity sound 162. The high-intensity sound can include a high SPL event such as a gunshot occurrence. The high-intensity sound can be caused by other high SPL events such as a car backfiring, an explosion, the movement of heavy equipment, vehicle horns, and so on. The analysis of the high-intensity sound can include analyzing spectral content of the acoustic information, examining an acoustic signature, and so on. The analysis can include analyzing an infrared event 164. The IR event can be caused by sunlight glinting off a shiny surface such as a moving automobile, a mirror, a wave in water, a window, and so on. In embodiments, the analysis is performed by the gunshot sensor device. The analysis may also be performed on another device such as a gunshot detection gateway, discussed elsewhere, on a local server, on a blade server, on a remote server, on a cloud-based server, on a mesh server, etc. The analysis of both the acoustic information and the infrared information can help to make a correlation that a possible gunshot event has occurred.

The flow 100 includes notifying the network, using the gunshot sensor device, of a possible gunshot occurrence 170. The gunshot sensor device can use cable-free communication to notify the network. The network can include a computer network such as the Internet, a local area network (LAN), a wide area network (WAN), an ad hoc network, a self-configuring network, a mesh network, and so on. The cable-free communication used for the notifying can include Wi-Fi, Bluetooth™, Zigbee™, etc. In embodiments, the cable-free communication to a network can include one or more powered communication relay devices. The powered communication relay devices, or "repeaters", can receive information using cable-free communication and can forward the information using wireless or wired techniques. The repeaters can be powered by utility power, backup power, a battery, etc. In other embodiments, the cable-free communication to a network can provide data to a gunshot detection gateway. The notifying can include sending data as a stream or as packets, sending email, sending a short message service (SMS) text, and the like.

The notifying can be based on an analysis of the high-intensity gunshot sound and the infrared event that was matched. As discussed throughout, a high-intensity gunshot sound is matched to an infrared event that occurred in time before the gunshot sound. The analysis can include matching the gunshot sound to a gunshot signature of a particular weapon. The analysis can be used to filter out periodic IR pulses that can result from a flashing fire alarm, security breach alert, lockdown siren, etc. The analysis can also be used for filtering out the IR noise of higher power bulbs, halogen lightbulbs, fluorescent lightbulbs, and so on. The IR noise that is filtered can be related to powerline frequencies, such 50 Hz or 60 Hz, or to a multiple of powerline frequencies, such as 120 Hz, or to some other periodic IR stimulation frequency.

The analysis can enable spurious acoustic information filtering such as reducing echo. In embodiments, the notifying comprises a fully operational mode of the gunshot sensor device. The flow 100 includes performing additional analysis 180 by the gunshot sensor device after the analysis of the high-intensity sound and the high-intensity infrared event that was matched. The additional analysis can include collecting additional acoustic information and IR information from one or more other gunshot sensor devices. The additional analysis can include collecting other data types. In embodiments, the possible gunshot occurrence activates a video monitoring device. A video camera or sensor can be activated to capture video data near the location of the possible gunshot occurrence, at one or more other locations within the indoor environment, etc. In other embodiments, the video monitoring device is part of a video monitoring system. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
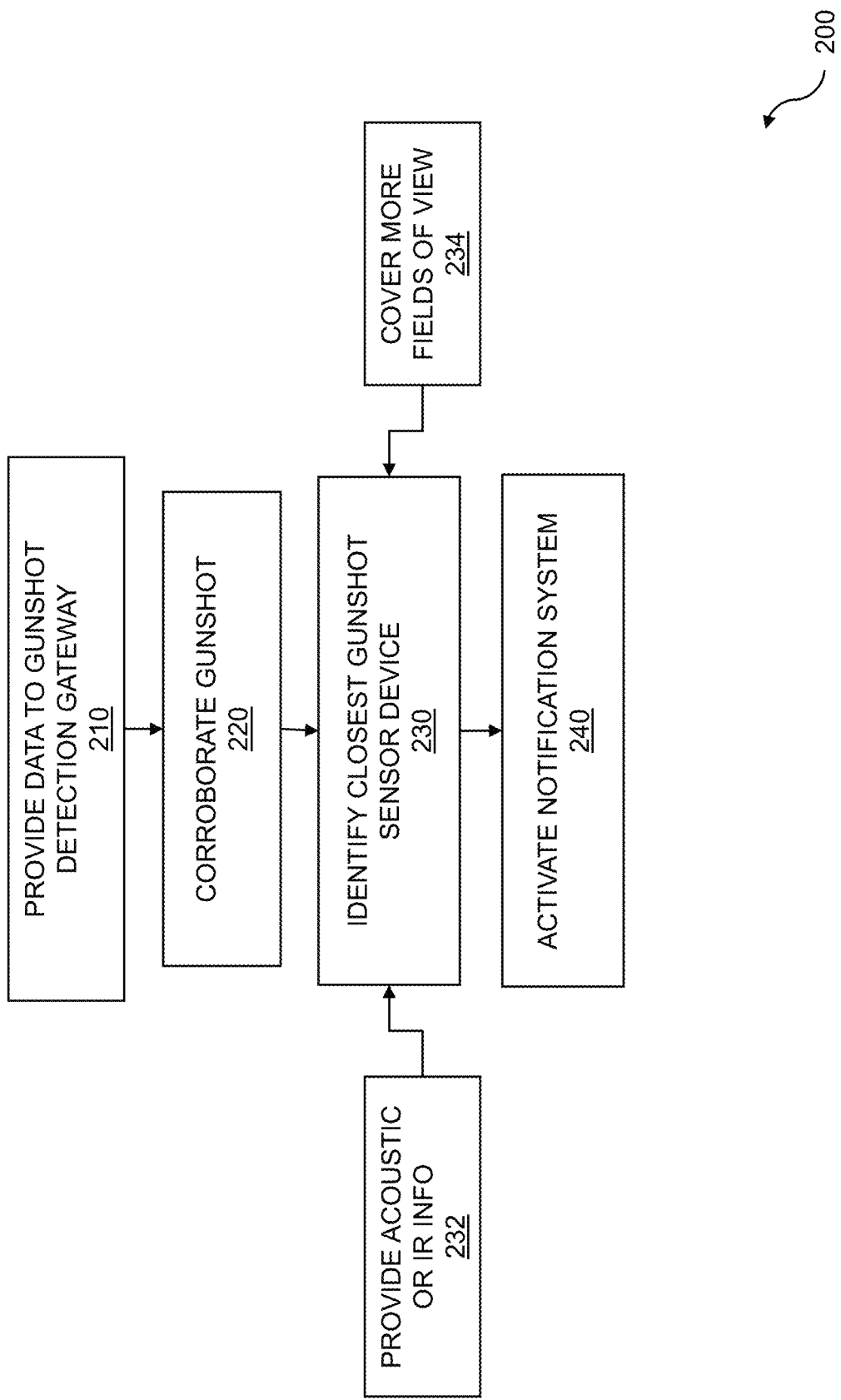
FIG. 2 is a flow diagram for gunshot detection gateway usage.

FIG. 2 is a flow diagram for gunshot detection gateway usage. As discussed throughout, acoustic information and infrared information are collected within an indoor environment using a gunshot sensor device. The acoustic information is monitored for a gunshot sound which is matched to a corresponding infrared event. A network is notified of a possible gunshot occurrence by the gunshot sensor device using cable-free communication. The gunshot sensor device is used for cable-free indoor gunshot detection. The gunshot sensor device can communicate with a gunshot detection gateway. The flow 200 includes cable-free communication to a network, where the cable-free communication to a network provides data to a gunshot detection gateway 210. The gunshot detection gateway can capture cable-free communications information from one or more gunshot sensor devices, can aggregate notifications of possible gunshot occurrences, can process information, and can send back commands or control information, and so on. The gunshot detection gateway can include one or more processors, a server, a blade server, a cloud server, a mesh server, and the like. The gunshot detection gateway can be located within the indoor environment or beyond the indoor environment. The gateway device can be used to collect information from multiple gunshot sensors installed within the premises. For example, in a large building such as a school, there can be several gunshot sensors installed in each hallway, and multiple gunshot sensors installed in large areas such as a gymnasium and cafeteria. The gateway device can collect information from each gunshot sensor and forward the information upstream to another system such as a security system.

The flow 200 includes the gunshot detection gateway corroborating an actual gunshot 220 occurrence based on data communicated from one or more additional gunshot sensor devices. Indoor gunshots can be very difficult to detect because high-intensity gunshot sounds, high sound pressure level (SPL) acoustic events, and so on, can echo off large walls, can travel down hallways or along multiple hallways (multipath), and so on. Further, an IR event such as a muzzle flash can reflect off shiny surfaces such as glass, mirrors, glossy finish painted surfaces, etc. A single gunshot detector device may detect both a high SPL acoustic event and a flash, but the source and/or direction of the acoustic and IR events may be indeterminate. In embodiments, one or more additional gunshot sensor devices can provide acoustic information or infrared information. The additional gunshot sensor devices can be located near the first gunshot sensor device, in sight of the first gunshot sensor device, around a corner from the first gunshot sensor device, and so on. In embodiments, the one or more additional gunshot sensor devices can cover one or more fields of view which are different from a field of view of the gunshot sensor device. By corroborating notification of a potential gunshot occurrence with acoustic and IR data collected from one or more other gunshot detector devices, the gunshot detection gateway can determine, with a higher level of confidence, that a gunshot event has occurred.

The flow 200 includes the gunshot detection gateway identifying which gunshot sensor device is closest to the gunshot 230. The identifying of the closest gunshot sensor device can be based on a variety of factors such as detection or no detection of a high-intensity gunshot sound or an IR event such as a muzzle flash; relative amplitude, sound pressure level; and so on. To support the identifying, the one or more gunshot sensor devices can provide acoustic or infrared information 232 to the gunshot detection gateway. The gunshot detection gateway can control the providing of acoustic or IR information by using cable-free techniques to selectively or collectively poll the one or more gunshot sensor devices for any acoustic or IR information that may have been detected. The gunshot detection gateway can collect acoustic or IR information from the one or more additional gunshot sensor devices based on locations, fields of view, etc., of the additional gunshot sensor devices. In embodiments, the one or more additional gunshot sensor devices cover one or more fields of view 234 which are different from a field of view of the primary gunshot sensor device. The gunshot detection gateway serves other purposes as well. In embodiments, the gunshot detection gateway can provide control information back to the gunshot sensor device using the cable-free network. The control information provided back to the gunshot sensor device can include one or more commands such as clear, read, write, reset, initialize, etc.

The flow 200 further includes activating a notification system 240 by the gunshot detection gateway based on the actual gunshot occurrence that was confirmed. The activating a notification system can include activating a local notification system. In embodiments, the notification system can include a local alarm system. The local alarm system can include aural or visual alerts, short message service (SMS) or text alerts, automatic telephone calls with response messages, and the like. In other embodiments, the notification system can include a remote notification. The remote notification can include notifying law enforcement and emergency response personnel, and so on. The notification system can include information and updates related to the source of the gunshot sound. In embodiments, the gunshot detection gateway can provide location data for the possible gunshot occurrence. The location data can be shared with local law enforcement or emergency personnel, used to recommend sheltering in place, used to recommend escape routes, etc. In embodiments, the notification system can include a gunshot tracking system. The gunshot tracking system can track the location of the original and subsequent gunshot occurrences, the potential location of a shooter, and so on. The gunshot tracking system can alert law enforcement and emergency response teams with updated and current information. In embodiments, corroboration of a possible gunshot occurrence can activate a video monitoring device. The video monitoring device can be used to capture video information from a location within the indoor environment. In embodiments, the video monitoring device is part of a video monitoring system. The video monitoring system can be used by law enforcement, emergency response, and other personnel to track, identify, isolate, etc., the potential shooter, an active shooter, etc. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
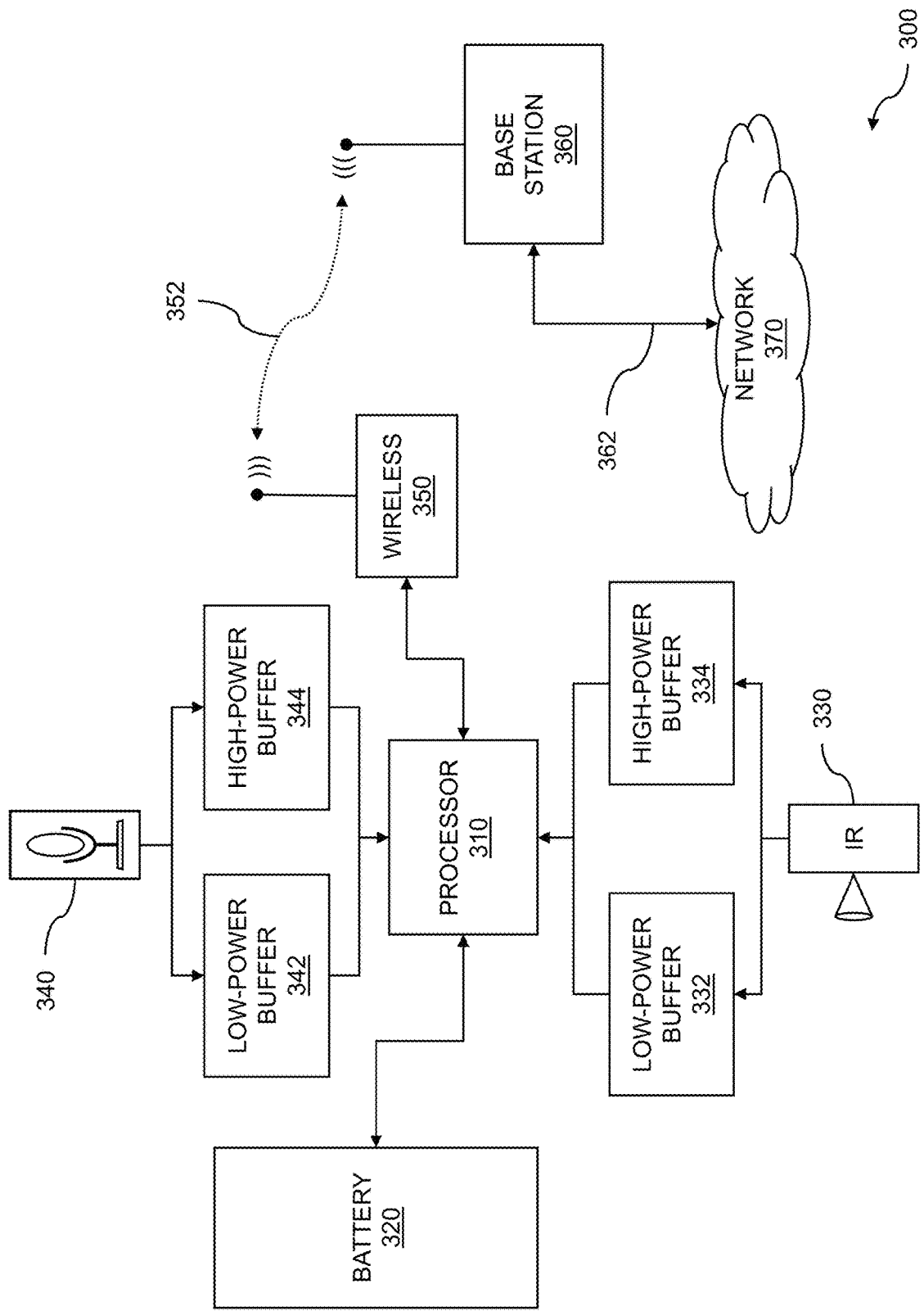
FIG. 3 is a system diagram for cable-free communication with a base station.

FIG. 3 is a system diagram for cable-free communication with a base station. Cable-free communication with a network, a base station, and other components enables cable-free indoor gunshot detection. The system 300 can include a processor 310. As discussed elsewhere, the processor can perform a variety of tasks related to gunshot detection such as controlling the operation of various components of the indoor gunshot detection system. The control of operation can include executing algorithms, code, heuristics, procedures, tasks, etc., related to gunshot detection. The processor can perform a variety of gunshot-related tasks such as collecting infrared (IR) information or acoustic information, processing the IR or acoustic information, and so on. The processor can enable monitoring for possible gunshot occurrences. The monitoring can include monitoring infrared data or acoustic data for muzzle flashes, high-intensity gunshot sounds, other gunshot related events, or other events such as explosions. The processor can perform other operations relevant to gunshot detection such as matching a high-intensity gunshot sound to buffered infrared information, notifying a network of a possible gunshot occurrence, etc. The system 300 can include a battery 320. The battery can include a rechargeable battery, a non-rechargeable battery, a single-user battery, and so on. A rechargeable battery may be recharged using a solar cell, a trickle charger, or the like.

The system 300 can include an infrared sensor 330. The infrared sensor can collect infrared information within an indoor environment. The system can include two or more infrared sensors, where the two or more infrared sensor can be oriented to cover different fields of view, overlapping fields of view, redundant fields of view, and so on. The infrared sensor can sense possible gunshot occurrences such as muzzle flashes. The infrared information is buffered within the gunshot sensor device. In embodiments, the infrared information that is buffered can use a low-power infrared information buffer 332 and a high-power infrared information buffer 334. The low-power infrared information buffer and the high-power infrared information buffer can be coupled to the processor 310 within the gunshot detection system. In embodiments, the low-power infrared information buffer can enable gunshot event confirmation. The gunshot event confirmation can include matching a high-intensity gunshot sound (discussed shortly) to the infrared information that was buffered. The confirmation can be based on matching, where matching can include making a correspondence between the gunshot sound and an infrared event that occurred in time before the gunshot sound. In embodiments, the high-power infrared information buffer can enable spurious infrared information filtering. Spurious infrared information can result from natural phenomena such as a lightning flash; sunlight flashing off a shiny surface such as a wave, a windscreen, or a window; and so on. In embodiments, the spurious infrared information filtering can include fire alarm filtering. The need for fire alarm filtering can result from a strobing light alert, where the spectra of the strobe can bleed over into the infrared range. In other embodiments, the spurious infrared information filtering includes high-level ambient lighting filtering. The need for high-level ambient lighting filtering can result from sunlight or another bright light source shining onto the infrared sensor 330.

The system 300 can include an acoustic sensor 340. The acoustic sensor can include a microphone, an audio transducer, etc. The acoustic sensor can include a low gain level for collecting only high sound pressure level (SPL) signals; a high gain level for collecting low SPL signals such as conversation, shouting, or other human-generated sounds; and so on. The system can include two or more acoustic sensors, where the acoustic sensors can cover different spaces, overlapping spaces, redundant spaces, and the like. The acoustic sensor can sense possible gunshot occurrences such as high-intensity gunshot sounds. Embodiments further include buffering the acoustic information. The acoustic information can be buffered in more than one buffer. In embodiments, the acoustic information that is buffered can use a low-power buffer 342 and a high-power buffer 344. The low-power acoustic information buffer 342 and the high-power acoustic information buffer 344 can be coupled to the processor 310 within the gunshot detection system. In embodiments, the low-power acoustic information buffer can enable gunshot event detection. The low-power acoustic information can be monitored for a high-intensity gunshot sound. In other embodiments, the high-power acoustic information buffer can enable spurious information filtering. Spurious information can result from banging equipment such as heavy machinery, loud sounds from extending or retracting bleachers, cheering crowds, crowds stomping feet in unison, vehicle horns, and so on.

The system 300 can include a wireless interface 350. The wireless interface can enable cable-free communication to another gunshot detection system, to communication equipment, to a network, and so on. The wireless interface can communicate using one or more wireless communication techniques including Wi-Fi, Bluetooth, Zigbee, near-field communication (NFC), and so on. The wireless interface may use a low power communication technique to reduce power consumption, to evade detection, etc. In embodiments, the cable-free communication 352 to a network can include one or more powered communication relay devices. The communication relay devices, or "repeaters", can repeat a signal from the wireless interface to extend range, to transfer a signal from one wireless interface to another wireless interface, to convert the wireless signal to a wired signal, and the like. The system 300 can include a base station 360. The base station can be in communication 362 with a network 370, such as the Internet or other computer network. In embodiments, the cable-free communication to a network can provide data to a gunshot detection gateway. The gunshot detection gateway can collect possible gunshot occurrence information, can aggregate possible gunshot occurrence information and so on. The gunshot detection gateway can access network-based resources such as servers or databases to analyze possible gunshot occurrences. In embodiments, the gunshot detection gateway corroborates an actual gunshot occurrence based on data communicated from one or more additional gunshot sensor devices.

Figure 4:
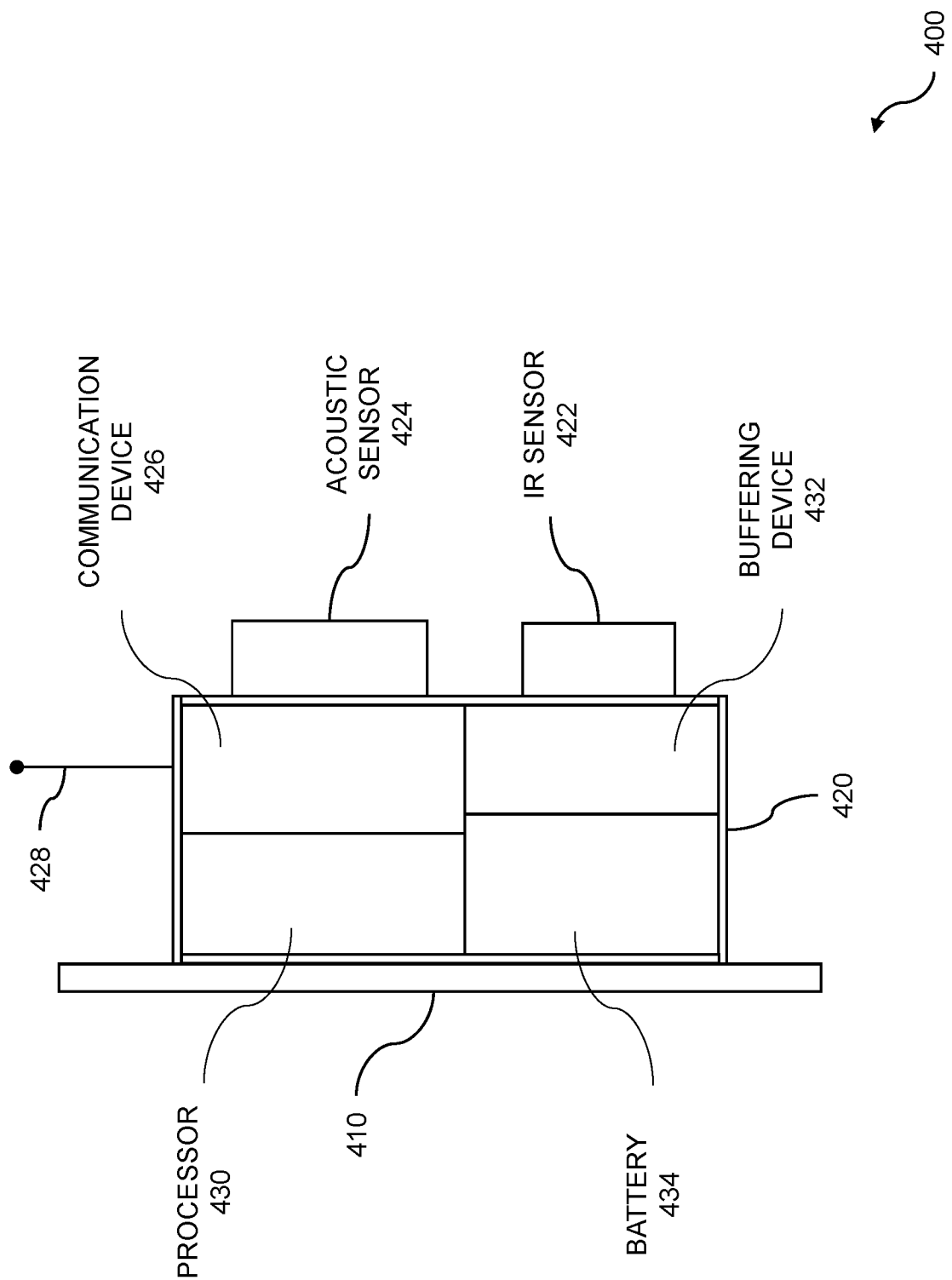
FIG. 4 is a diagram of a cable free gunshot sensor.

FIG. 4 is a diagram of a cable-free gunshot sensor. A cable-free gunshot sensor can be used for cable-free indoor gunshot detection. Acoustic information and infrared information can be collected. The acoustic information can be monitored using a gunshot sensor device to identify a high-intensity gunshot sound and to match the sound to infrared information. The matching includes making a correspondence between the gunshot sound and an infrared event. A network is notified of a possible gunshot occurrence based on the gunshot sound corresponding to the infrared event. A cable-free gunshot sensor is shown 400. The gunshot sensor can be mounted on a wall 410, a ceiling, a post, a barricade, a partitioning wall, an office cubicle, and so on. The gunshot sensor can comprise a housing 420. The housing can enclose some or all of the gunshot sensor components as discussed throughout. The housing can be affixed to a surface such as a wall or can be temporarily attached to another surface. The gunshot sensor can include an infrared sensor 422 contained in a wall-mountable housing. The infrared sensor can also be contained on other mountable housings, and discussed above. The infrared sensor collects infrared data, where the infrared data can be generated nearby to the infrared sensor. The infrared sensor provides the infrared data to a buffering device 432 connected to the infrared sensor. The buffering device may store the infrared data based on amplitude, noise, characteristics of the infrared data, etc. The buffering device enables infrared monitoring, where the infrared monitoring can include monitoring for muzzle flashes or other gunshot related events.

The gunshot sensor can include an acoustic sensor 424 contained in the wall-mountable housing. The housing can be mounted on other surfaces as discussed above. The acoustic sensor can collect high-intensity sounds, where the high-intensity sounds can include gunshots, explosions, fireworks, or other high-intensity acoustic events. The acoustic sensor enables acoustic monitoring. While the acoustic sensor can be enabled to detect only high sound pressure level (SPL) events, the acoustic sensor may also be set to detect low level acoustic data such as talking, shouting, or other human-generated sounds. The acoustic sensor settings can include adjustable gain. The gunshot sensor can include a cable-free communication device 426 contained in the wall-mountable housing. The cable-free communication device can enable communication between the gunshot sensor device and other devices such as a gateway, a network, other gunshot sensors, other sensors such as smoke or carbon monoxide sensors, and so on. The cable-free communication device can communicate with a repeater device, where the repeater device can forward or "repeat" data and information sent from the cable-free gunshot sensor. The repeater device can send and receive wireless signals, wired signals, or both wireless and wired signals. The cable-free communication device can use a variety of wireless communications techniques such as Wi-Fi, Bluetooth, Zigbee, etc. The cable-free communication device can be coupled to an antenna 428 or other device appropriate for sending and receiving communication data. The antenna can include a whip, a Yagi, a waveguide, a radome, etc.

The gunshot sensor can include a processor 430 contained in the wall-mountable housing. The processor can be connected to the acoustic sensor, the buffering device, and the cable-free communication device. The processor can control operation of the gunshot analysis apparatus. The control of operation can include executing code, procedures, algorithms, heuristics, etc., appropriate to gunshot detection. The processor can perform a variety of gunshot-related tasks such as increasing infrared or acoustic signal amplitude, reducing noise, flagging characteristics of the infrared data, etc. The processor can enable monitoring for possible gunshot occurrences. The monitoring can include monitoring infrared data or acoustic data for muzzle flashes, high-intensity gunshot sounds, other gunshot related events, or other events such as explosions. The processor can perform other operations relevant to gunshot detection such as matching a high-intensity gunshot sound to buffered infrared information, notifying a network of a possible gunshot occurrence, etc.

The processor can enable a low-power mode. In embodiments, the collecting and the monitoring comprise a low-power mode of the gunshot sensor device. The low-power mode can be used to minimize power consumption by the gunshot sensor. The processor can be used to support other power level operations. Further embodiments include periodic excursions to a higher-power mode by the gunshot sensor device, where the higher power mode enables cable-free communication. The cable-free communication can include using the network to communicate with a gunshot detection gateway. Data that can be exchanged using the cable-free communication can include health data relating to the gunshot sensor. In other embodiments, the health data can include one or more of gunshot sensor device identification (ID) data, battery levels, battery drain rate, self-diagnostic data, local communication data, or additional event data. Medium-power modes can also be supported. Further embodiments include moving from the low-power mode to a higher power mode to facilitate cable-free communication to the network. The gunshot sensor device can include a battery 434. The battery can include a rechargeable battery, a non-rechargeable or single-use battery, and so on. The battery is coupled to the gunshot sensor and provides power to the devices of the gunshot analysis apparatus. In embodiments, the battery can be recharged, where the recharging of the battery can be based on solar charging, trickle charging, quick charging, and the like. In embodiments, the battery can be contained within, on, or next to the wall-mountable housing.

Figure 5:
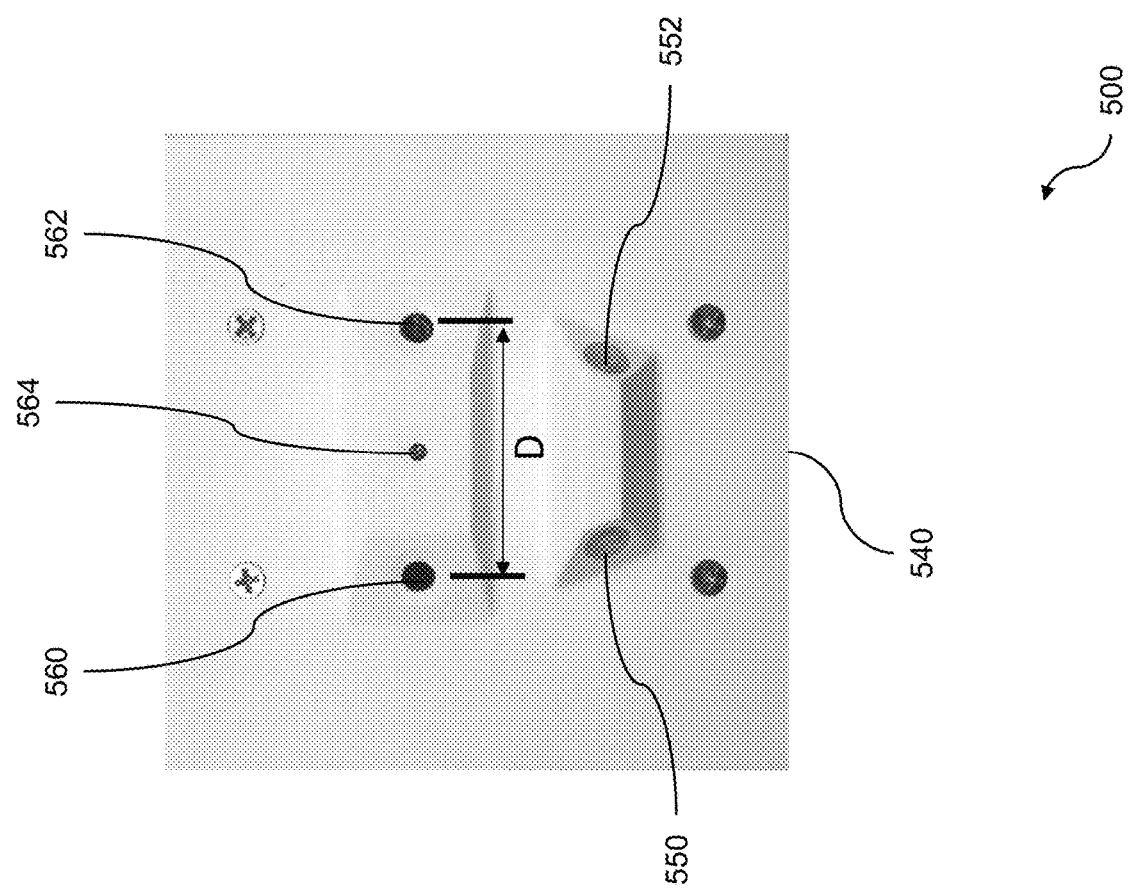
FIG. 5 is a diagram of a gunshot sensor unit.
Figure 5:
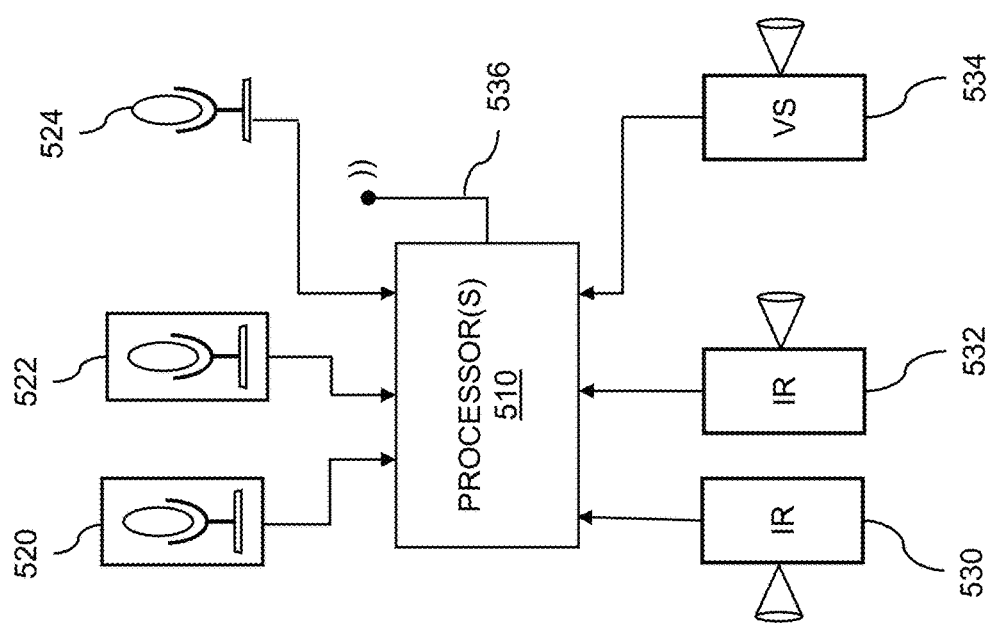

FIG. 5 is a diagram of a gunshot sensor unit. Indoor gunshot detection can be based on infrared information and acoustic information, where both types of information can be collected by a gunshot sensor device within an indoor environment. Video collection can be initiated based on the detecting of the gunshot. Video analytics can be performed for tracking a suspected shooter of the gunshot using the collected video. An audio microphone can be activated based on the detection of the gunshot. The tracking of the shooter can be further based on the audio microphone that was activated. The gunshot sensor unit enables cable-free indoor gunshot detection. An example of a sensor unit 500 is shown for indoor gunshot detection. A sensor can include one or more processors 510, two infrared sensors 530 and 532, two acoustic sensors 520 and 522, and a microphone 524. The microphone 524 can be a surveillance microphone that is normally disabled and is only enabled in response to detection of a possible gunshot. The infrared sensors 530 and 532 can be used to obtain infrared information, where the infrared information can include a muzzle flash, a flash from an explosion, heat from a flame, etc. The acoustic sensors 520 and 522 can be used to detect high sound pressure levels (SPL) events such as shock waves, where the sound pressure levels of the events can be compared to the SPLs of muzzle blasts from gunfire, explosions, and other events. The microphone 524 can be activated based on detecting a gunshot. The gunshot sensor can include an antenna 536 to support cable-free communication. The cable-free communication can be based on Wi-Fi, Bluetooth™, Zigbee™, or other short-rage to medium-range cable-free communications techniques. The cable-free communications techniques can support communication to a wired network, to a wireless repeater, to a hybrid network, and the like.

The microphone 524 can be used for tracking a suspected shooter. The microphone can be activated for a first limited period of time. The first limited period of time can include times when the microphone is active, and any audio information collected during the first limited period of time can be used for a variety of reasons, such as diagnostic purposes. The microphone can stay active for a second limited period of time. The second period of time can be used for information gathering, including tracking information. The information collected from the microphone can be discarded after a third limited period of time. The discarding of information collected by the microphone can serve various purposes including security, confidentiality, and so on. In some embodiments, the microphone 524 is configured to be operative during normal conditions at a very low gain, such that it only detects sounds in excess of 130 decibels. In this way, the microphone 524 can be used to detect sounds from gunshots without picking up other sounds, such as conversations. Once a gunshot is detected, the gain is adjusted so that the microphone 524 can pick up additional information to help law enforcement assess the situation. Thus, once a gunshot is detected, the microphone gain can be adjusted to pick up sounds at a lower sound level (e.g. 50 decibels) so that conversations and other sounds can be detected during the emergency situation.

A gunshot sensor device can further include a video system 534. The video system 534 can include a video camera and additional sensors to capture video data and can be configured to activate upon detection of a possible gunshot. The video data that is captured can include visible light, infrared light, and other light spectra useful to gunshot detection. Embodiments perform video analytics based on video obtained from the video system 534. The video analytics can track a suspected shooter of the gunshot using the collected video.

An example gunshot sensor 540 is shown. The sensor 540 can include infrared (IR) sensors 550 and 552, acoustic sensors 560 and 562, and a microphone 564. The acoustic sensors 560 and 562 can be oriented at different angles and spaced apart by a distance D. In some embodiments, the distance D is 1.25 inches. In other embodiments, a single acoustic sensor is employed. Since a shock wave from a bullet is directional, one of the acoustic sensors (e.g. 560) may detect the shock wave while the other sensor (e.g. 562) may not. This information can be used as part of a forensics analysis to estimate a trajectory of a fired projectile/bullet. Similarly, the IR sensors 550 and 552 can also be disposed at different angles to increase the range of coverage within the indoor environment.

The gunshot sensor can include video cameras and an analyzer. The analyzer can be used to detect a gunshot, in an indoor environment, based on the infrared information and the acoustic information. In embodiments, the analyzer is implemented by code executing on the one or more processors 510. The analyzer, or gateway, can perform video analytics based on video obtained from the video cameras. The video analytics can track a suspected shooter of the gunshot using the video that was collected. The acoustic sensors 560 and 562 can be oriented at different angles and spaced apart by a distance D. In some embodiments, the distance D is 1.25 inches. In other embodiments, a single acoustic sensor is employed. Since a shock wave from a bullet is directional, one of the acoustic sensors (e.g. 560) may detect the shock wave while the other sensor (e.g. 562) may not. This information can be used as part of a forensics analysis to estimate the trajectory of a fired projectile/bullet. Similarly, the IR sensors 550 and 552 can also be disposed at different angles to increase the area of coverage. While one configuration of IR sensors, acoustic sensors, and a microphone is shown, other embodiments include different numbers and configurations of the IR sensors, acoustic sensors, and the microphone. In other embodiments, additional IR sensors, acoustic sensors, microphones, video sensors, and processors are present in the gunshot sensor. In some embodiments, the sensor 540 is sized appropriately to fit into a standard 4×4 inch opening such as an opening used for a double light switch or a double electrical outlet. In this way, gunshot sensors of disclosed embodiments are easily installed within existing infrastructure.

Thus, the gunshot sensor can comprise an infrared sensor and an acoustic sensor. Furthermore, the gunshot sensor can further comprise a second infrared sensor and a second acoustic sensor. The infrared sensor and the second infrared sensor can be directionally pointed to cover different fields of view. The acoustic sensor and the second acoustic sensor can be configured to ignore voices, unless specifically enabled under certain conditions. The acoustic sensors can be configured to detect shock waves, and/or very loud sounds (e.g. 110-130 decibels or higher).

Figure 6:
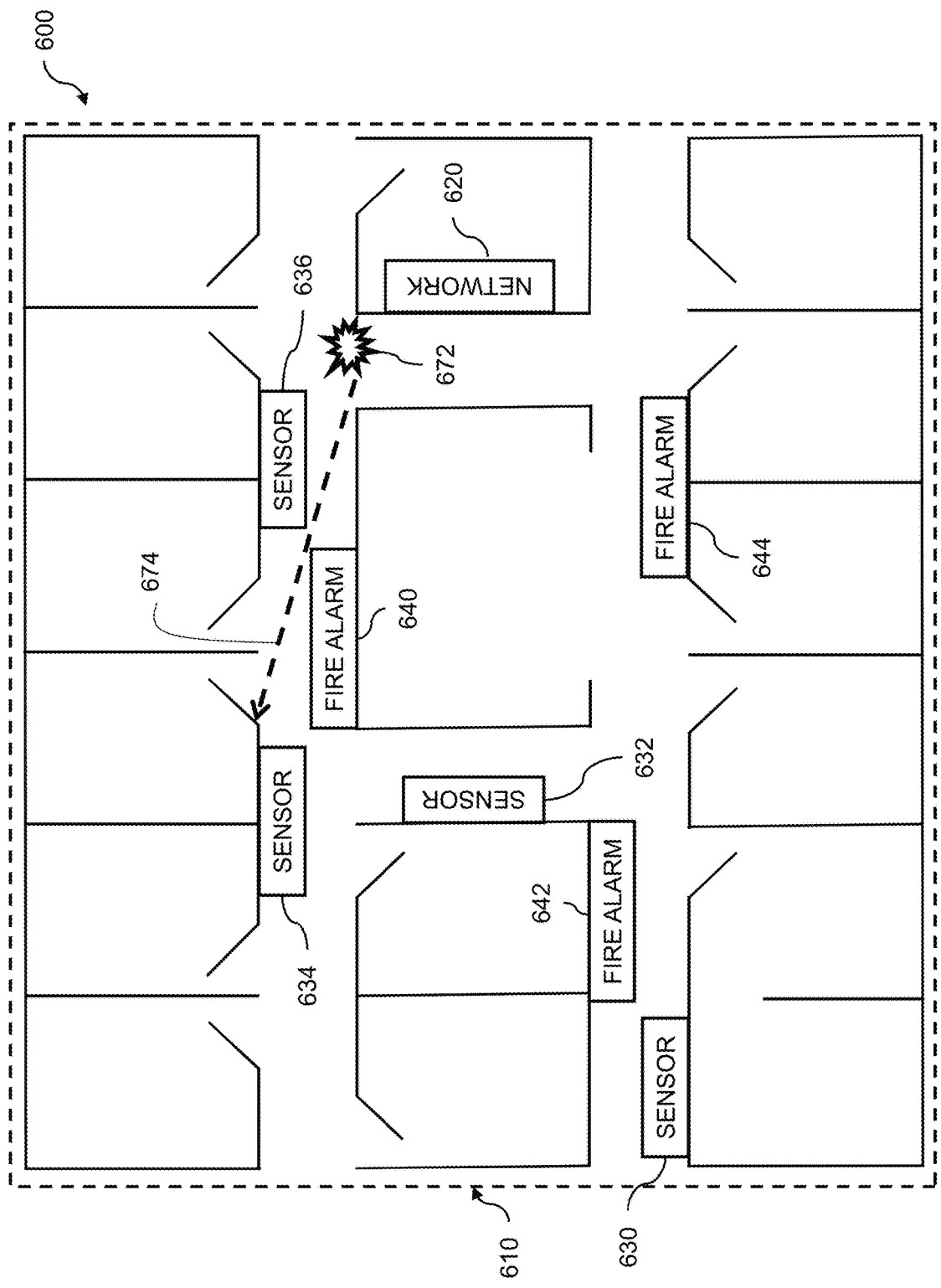
FIG. 6 is an example indoor sensor configuration.

FIG. 6 is an example of a sensor configuration within an indoor area. The indoor area 600 has a perimeter 610 and can be similar to an office, house, or other such environment, with a plurality of individual rooms. A plurality of gunshot sensors 630, 632, 634, and 636 are installed at various positions within the area 600. A plurality of fire alarms 640, 642, and 644 are also installed at various positions within the area 600. A network 620 is installed within the area 600, and is configured to receive inputs from the plurality of gunshot sensors 630, 632, 634, and 636. In embodiments, the network communicates with the gunshot sensor devices 630, 632, 634, and 636 using cable-free techniques such as Wi-Fi™, Bluetooth™ Zigbee™, and so on. In other embodiments, the network 620 communicates with the gunshot sensors via a wired communication interface, such as Ethernet, RS-232, RS-422, RS-488, and the like. The network 620 can include both cable-free and cabled communication interfaces to onsite servers or processors, cloud-based servers, mesh servers, etc. In embodiments, the network 620 also receives input from the plurality of fire alarms 640, 642, and 644. In such embodiments, when a fire alarm is activated, information pertaining to the time and duration of each strobe and/or buzzer activation of the fire alarms is communicated to the gunshot sensors, such that the gunshot sensors can compensate for the active fire alarm. In some embodiments, the compensation includes utilization of windowing techniques. In this example, a gunshot is fired at location 672, causing a projectile trajectory as indicated by path 674. In this situation, the gunshot sensor 636 is closest to the path 674. As the projectile/bullet passes by the sensor 636, a shock wave from the projectile is received by the acoustic sensors within the gunshot sensor 636. As discussed elsewhere, the acoustic sensors of the gunshot sensor device are spaced apart by a distance D, or alternatively, a single acoustic sensor is employed. In this configuration, each acoustic sensor within the gunshot sensor device receives the shock wave at a slightly different time. This difference in time can be used to infer information about the gunshot, such as the approximate direction from which the projectile was fired, and/or the approximate speed of the projectile.

The gunshot sensor devices can be deployed throughout an indoor space. The indoor space can include rooms such as hotel rooms, hospital rooms, and classrooms; hallways; common areas such as lounges, meeting rooms, and lobbies; gymnasiums, cafeterias, stairwells, restrooms; and so on. Therefore, the gunshot sensor devices can be used to determine that a gunshot event has occurred and this occurrence can be determined independently of the specific position of the gunshot sensor device(s). Thus, the gunshot sensor devices do not require knowledge of their position and the gunshot detection system does not require knowledge of the specific locations of the sensors. The goal of gunshot detection analysis is to accurately detect that a gunshot has occurred.

Environmental and manmade light and noise sources can confound the infrared sensor and the acoustic sensor because the environmental and manmade sources can produce infrared signals and acoustic signals that are similar to those produced by gunshot events. An example of an environmental signal source is a reflected flash of sunlight off a moving vehicle, mirror, or another shiny object. An example of a manmade source is a strobe. Strobes are ubiquitous and are used to serve many purposes including emergency and danger warnings, alerts, and so on. Strobes are commonly deployed in buildings for purposes such as fire alarms and other warning systems, and are routinely displayed on vehicles such as emergency vehicles, forklifts, transport vehicles, carts, heavy equipment, school buses, dangerous equipment, and so on. Other common uses of strobes include specialty lighting with uses for photography, public gathering places (e.g. dance clubs), halogen lights, etc. A strobe flash contains visible light spectra and can "bleed over" into other spectra, including infrared, which can cause a false gunshot detection. In embodiments, analysis is performed to detect that a number of strobes have occurred and that these occurrences create a problem for gunshot evaluation. In some cases, an environmental cause can be determined and modifications to the environment can be recommended. For instance, a gunshot sensor device can be moved so that it does not pick up reflected sunlight from cars parked in a nearby parking lot that is visible through a window in a building. Other similar modifications can be recommended for the gunshot sensor devices themselves or for the surrounding environment.

Figure 7:
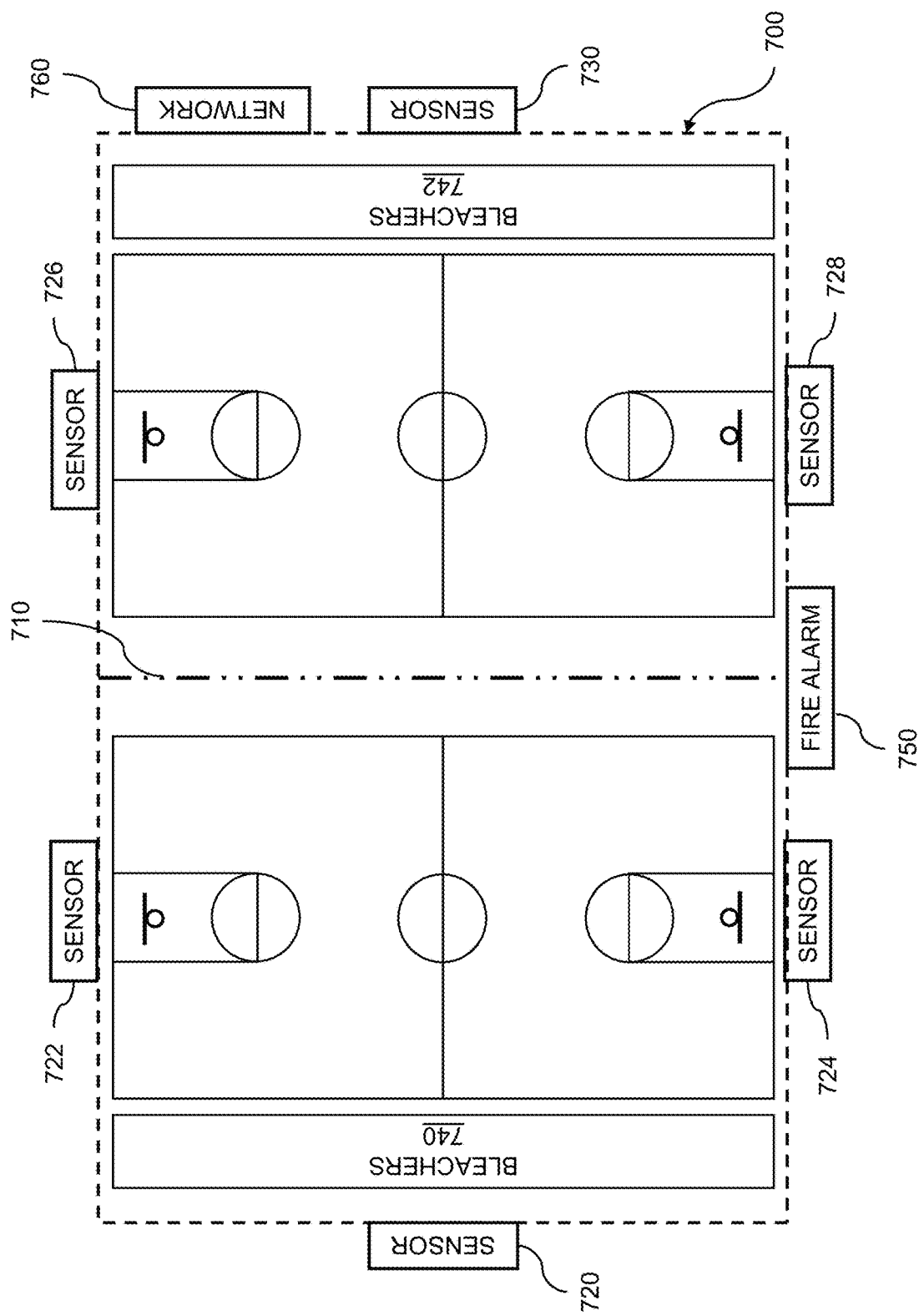
FIG. 7 illustrates an indoor sensor configuration with six sensors.

FIG. 7 illustrates an indoor sensor configuration with six sensors 700. The six sensors can include gunshot sensor devices, and can be located in a large or open indoor space such as a gymnasium, a split gymnasium (shown), a basketball court, a concert hall and so on. The sensors support cable-free indoor gunshot detection. The sensors can collect acoustic and infrared information, where the acoustic information is monitored for a gunshot sound. The gunshot sound is matched to the infrared information, and a network is notified using the gunshot sensor device. As is common in a school gymnasium, a partition wall 710 can be extended to partition a gymnasium into two smaller areas. In such situations, a configuration of six gunshot sensor devices can be used. The six gunshot sensor devices can include sensors 720 and 730 located on the shorter walls of the split gymnasium, and sensors 722, 724, 726, and 728 located along the longer walls of the split gymnasium. Loud noises from events such as closing or opening the bleachers 740 and 742 do not trigger false alarms with gunshot sensors in disclosed embodiments. Even though manipulating the bleachers can make loud noises, it does not generate shock waves or infrared signatures, and thus, disclosed embodiments discern that such noise does not result from gunshots.

A fire alarm 750 is installed within the area 700. A network 760 is installed within the area 700 and is configured to receive inputs from the plurality of gunshot sensors 720, 722, 724, 726, 728, and 730. In embodiments, the network 760 also receives input from the fire alarm 750. In such embodiments, when a fire alarm is activated, information pertaining to the time and duration of each strobe or klaxon activation of the fire alarm is communicated to the gunshot sensors, such that the gunshot sensors can compensate for the active fire alarm. In some embodiments, the compensation includes utilization of windowing techniques. For example, a first gunshot can be fired at a first location within the split gymnasium and a second gunshot can be later fired at a second location within the split gymnasium. Information from each gunshot sensor device that detects the gunshot event can be sent to the network 760, which can then perform analysis on the gunshot information or send the information to another system for further analysis. In embodiments, the gateway 760 sends the gunshot information to a server in the cloud via a computer network such as the Internet. In this way, assailants can neither damage nor destroy the forensic evidence, even if they attempt to destroy equipment at the premises. Analysis in accordance with disclosed embodiments can correlate the IR signatures from the gunshot sensor devices that detect the gunshot events to determine that the inputs received from the sensors all pertain to the same gunshot fired at the location, while the gunshot fired at the second location and detected primarily by the gunshot sensor is a different gunshot event. Hence, disclosed embodiments are well suited for detecting multiple gunshots in an indoor environment, including an indoor environment comprising a gymnasium, split gymnasium, a long hallway, etc., which is often found in a public building such as a school.

Figure 8:
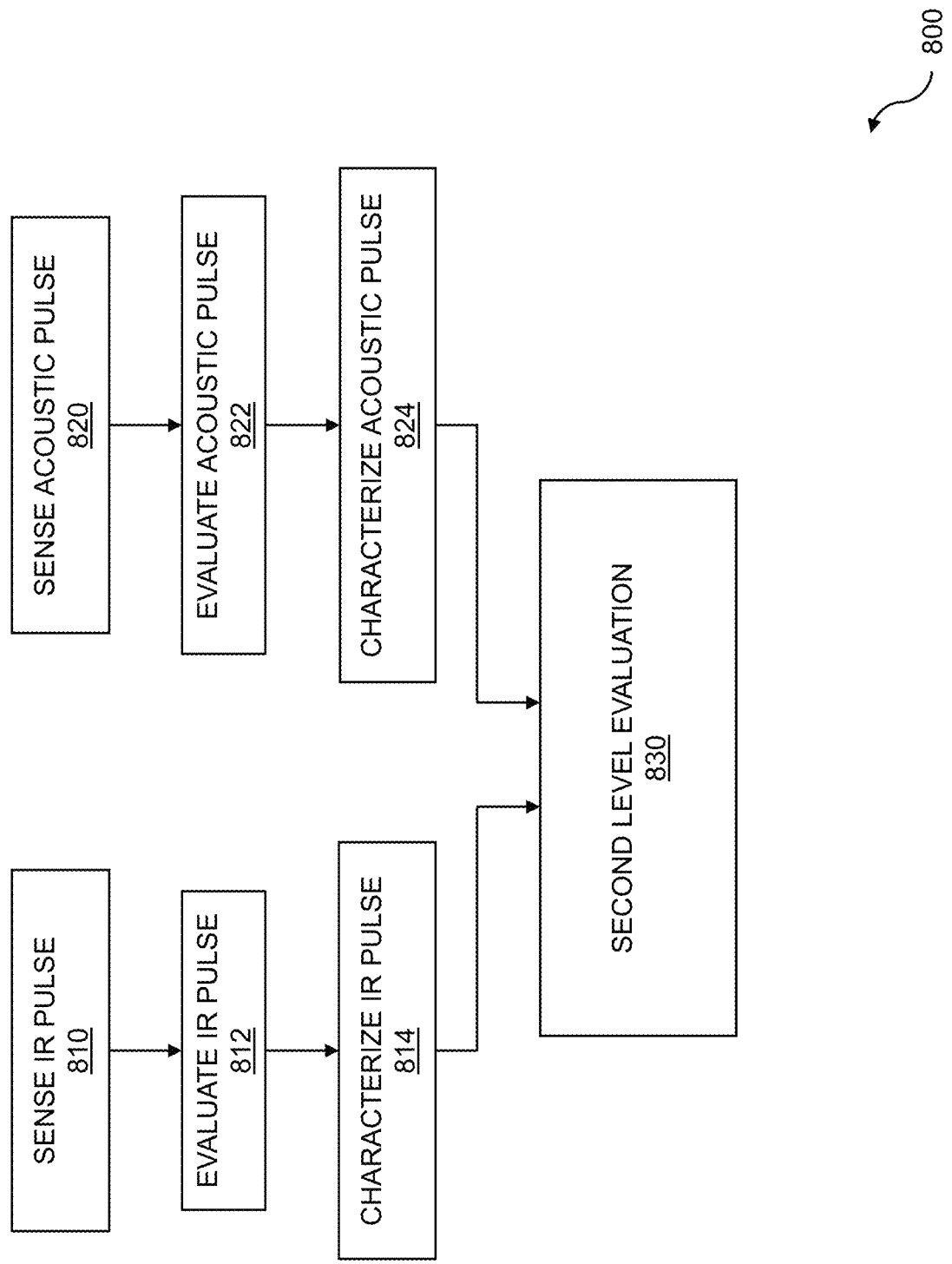
FIG. 8 is a logic flow diagram for signal analysis.

FIG. 8 is a logic flow diagram for signal analysis. The signal analysis supports cable-free indoor gunshot detection based on a gunshot sensor device. The gunshot sensor device collects acoustic information and infrared information. The acoustic information is monitored for a gunshot sound, and the gunshot sound is matched to an infrared event. A network is notified of a possible gunshot occurrence using a cable-free technique. The flow 800 includes sensing an IR pulse 810. In embodiments, the IR pulse has a duration ranging from about one millisecond to about twenty milliseconds. The duration can vary depending on the firearm. The flow 800 continues with evaluating the IR pulse 812. This can include determining peaks along different wavelengths within the range of IR acquisition. The flow 800 continues with characterizing the IR pulse 814. The characterizing can include identification of a particular peak and associating that peak with a known spectral signature from a firearm discharge.

The flow 800 includes sensing an acoustic pulse 820. The acoustic pulse can include a shock wave having a characteristic "N" shape that originates from the projectile, and/or a sound wave that originates from the firearm. The flow 800 includes evaluating and measuring the acoustic pulse 822. The flow 800 includes characterizing the acoustic pulse 824. The characterizing can include identification of a particular acoustic pulse and associating that acoustic pulse with a known acoustic signature from a firearm discharge.

The flow 800 includes performing a second level evaluation 830. The second level evaluation comprises assembling results from one or more gunshot sensors. The flow 800 can comprise assembling results from the gunshot sensor along with a second gunshot sensor in a gateway device. The assembling can be accomplished independently of location for the gunshot sensor and location for the second gunshot sensor.

In embodiments, the assembling includes computation of a gunshot score, based on multiple sensor inputs. The sensor inputs can include shock wave detection, sound wave detection, and infrared detection. Furthermore, in embodiments, the gunshot score G is computed as:

$$K_1 f_1(S) + K_2 f_2(I) + K_3 f_3(N)$$

where S is the shock wave information, I is the infrared information, and N is the sound wave information. The function $f_1$ returns a value based on magnitude of the shock wave. The function $f_2$ returns a value based on the spectral signature of the infrared information. The function $f_2$ can include a correlation function and/or best fit function for an infrared signature that resembles that from firearm discharge. The function $f_3$ returns a value based on the magnitude of a sound wave. $K_1$, $K_2$, and $K_3$ are constants. The constants can be set to appropriately weight each of the three inputs. When the gunshot score S exceeds a predetermined level, a gunshot is deemed to have likely occurred. A gateway device can report this information to upstream systems such as campus security systems, law enforcement systems, and the like.

Figure 9:
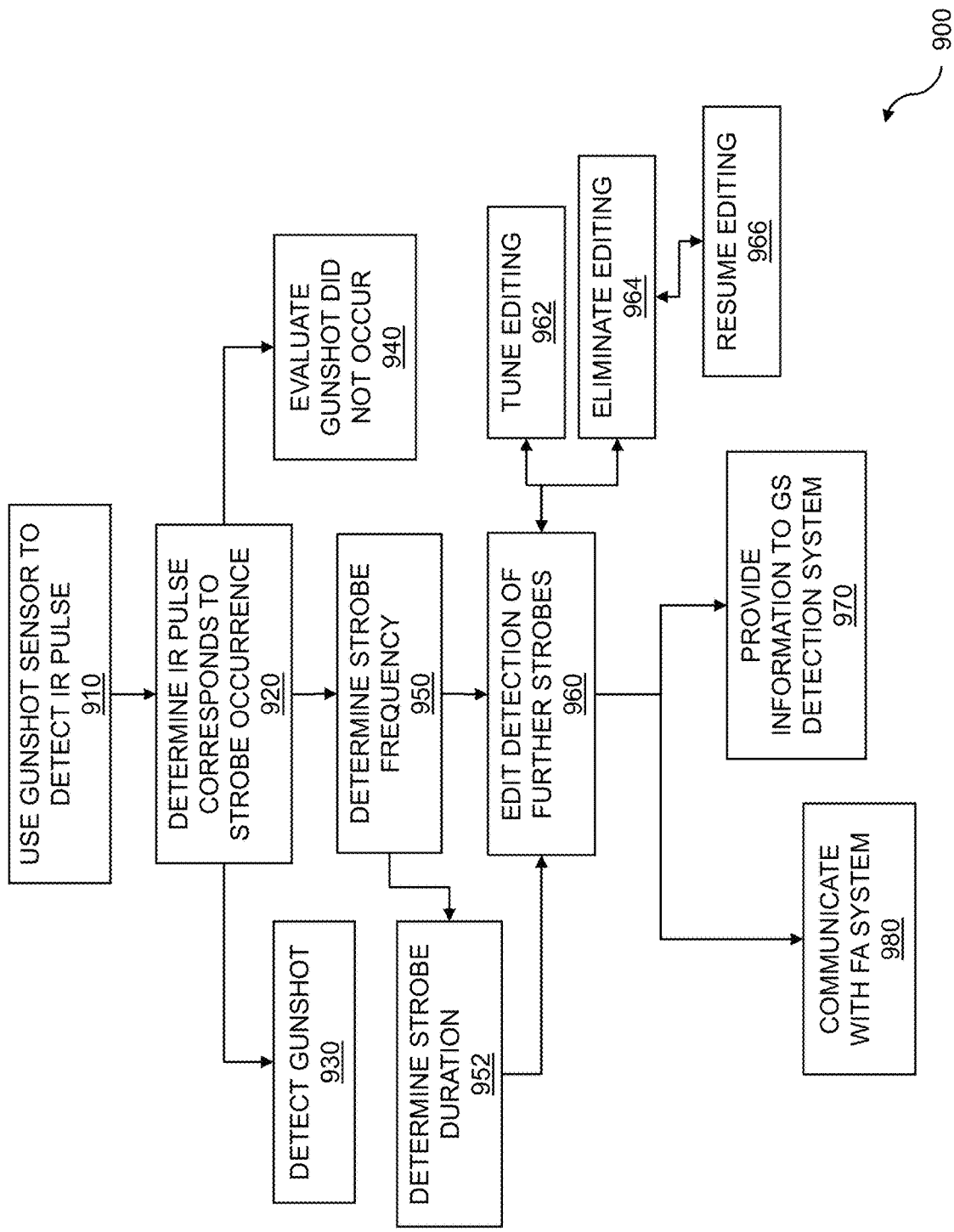
FIG. 9 is a flow diagram for gunshot analysis.

FIG. 9 is a flow diagram for gunshot analysis. Gunshot detection analysis can use a gunshot sensor device to collect acoustic information and infrared information. The acoustic information is monitored to identify a high-intensity gunshot sound, and the high-intensity gunshot sound is matched to infrared information what was buffered. A network is notified of a possible gunshot occurrence based on analysis of the high-intensity gunshot sound and an infrared event that was matched. In embodiments, the infrared pulse can be determined to correspond to a strobe occurrence. Based on this strobe occurrence, it can be determined that a gunshot has not taken place. The flow 900 includes using a gunshot sensor device to detect an infrared pulse 910, where the gunshot sensor device can include an infrared sensor and an acoustic sensor. In embodiments, the gunshot sensor device includes other sensors such as a microphone, a visual sensor, etc. The gunshot sensor device can be placed in an outdoor location or within an indoor location. In embodiments, the gunshot sensor device is mounted on a wall, on a ceiling, etc., where the wall and/or the ceiling can be in an indoor room, in a hallway, in a common space such as a lounge or meeting room, and so on.

The flow 900 includes determining that the infrared pulse corresponds to a strobe occurrence 920. A fire alarm can include a strobe that produces a visible alert and a sounder that produces an alarm, codes, voice messages, etc. Thus, a strobe occurrence can comprise a fire alarm. When the fire alarm is activated, the alarm can produce visible strobes and can emit the alarm, codes, voice messages, etc. The fire alarm strobes can be produced at a frequency, and each strobe can have a duration. The light produced by the fire alarm strobe can include infrared light spectra, visible light spectra, and so on. The infrared spectra of the fire alarm strobe can be detected by the infrared sensor included in a gunshot sensor. The flow 900 includes evaluating that a gunshot did not occur 940 based on the strobe occurrence. As discussed above, an activated fire alarm can produce a visual alert in the form of a series of strobes, and an audio alert in the form of an alarm, codes, voice messages, etc. The fire alarm strobes can be detected by the gunshot sensor as infrared pulses. A gunshot produces an infrared pulse from a muzzle flash, and it also produces a high sound-pressure level (e.g. 120 dB to 160 dB) impulse. When a gunshot occurs, both an infrared pulse and a high sound-pressure level impulse are detected. Without the high sound-pressure level, the detected infrared pulse can be attributed to a strobe occurrence that can include a fire alarm strobe.

The flow 900 includes detecting a gunshot 930, while the fire alarm is occurring, based on information from the infrared sensor and the acoustic sensor. As previously stated, a gunshot event includes both an infrared pulse and a high sound-pressure impulse. The coincidence in time of the infrared pulse and the high sound-pressure level impulse can be attributed to the gunshot. Since the gunshot emits an infrared pulse and a high sound-pressure level, and the fire alarm emits a sequence of light pulses, where the light pulses include infrared spectra, visible light spectra, etc., detecting a gunshot occurrence can be complicated. In some embodiments, the gunshot occurs at a different time from the strobe occurrence. The gunshot can be differentiated from the fire alarm strobe by the coincidence of an infrared pulse and a high sound-pressure level for the gunshot. For the fire alarm strobe, the acoustic sensor can sense an absence of an acoustic pressure wave that can correspond to a gunshot during a timeframe of the strobe occurrence (e.g. no bang, no gunshot). When a gunshot and a fire alarm strobe produce infrared impulses at substantially the same time, the gunshot cannot be differentiated from the fire alarm strobe. The strobe occurrence can interfere with gunshot detection evaluation because the two strobes can be detected as one infrared pulse, where the infrared pulse can coincide with the high sound-pressure level impulse.

The flow 900 includes determining a frequency of strobe occurrences 950. The determining of the frequency of strobe occurrences can be accomplished using various techniques, such as measuring a period of time between an infrared pulse and the next infrared pulse (seconds/cycle), and inverting the time period to obtain frequency (cycles/second). Since the time periods between successive infrared pulses might not be equal, a time tolerance can be determined. The flow 900 includes determining a duration 952 for strobes within the strobe occurrences. The duration for strobes within the strobe occurrences can be determined using various techniques, such as the time difference between a pulse rise and a pulse fall, the time difference between the 50-percent point of a pulse rise and the 50-percent point of a pulse fall, and so on. Since the durations of successive infrared pulses might not be equal, a time tolerance associated with pulse duration can be determined.

The flow 900 includes editing detection of further strobe occurrences 960 based on the frequency of strobe occurrences. Detecting infrared pulses and high sound-pressure waves requires analysis to determine whether the infrared pulses were attributable to a fire alarm or a muzzle blast from a gunshot. Infrared pulses could be falsely tagged as gunshots, or worse, true gunshots could be incorrectly tagged and missed as fire alarm strobes. To reduce the analysis load, infrared pulses that correspond to strobe occurrences can be edited. Editing can include editing out a time window for sensing by the infrared sensor. By making the infrared sensor ignore infrared pulses that correspond to the fire alarm strobe or strobes, the analysis can be reserved for detecting gunshots, tracking gunshots, etc. The editing can be performed based on both the strobe frequency and the strobe duration. The flow 900 includes tuning the editing 962 as more information on the sequence of strobes is collected. The detection of additional infrared pulses can be used to detect pulse frequency, duration, and tolerance. As more pulses are detected, the editing can be tuned to track the fire alarm strobe occurrences more accurately. Tuning can include better prediction of the time of arrival of the next infrared pulse from the fire alarm strobe, minimizing duration of the editing to reduce the amount of time the infrared sensor detection is edited out, and so on. The flow 900 includes eliminating the editing 964 once the further strobe occurrences discontinue. Fire alarms can produce strobes and can also produce alarms, codes, voice messages, etc., for a period of time, and can then stop the strobes for a period of time. During the time that the strobes are not flashing, the editing can be eliminated or suspended, since any infrared pulse that can be detected during the absence of a fire alarm strobe can be a gunshot. The flow 900 includes resuming the editing 966 when further strobe occurrences resume. Just as fire alarms can stop producing strobes, the fire alarms can resume producing strobes. Since the strobes from a given fire alarm are likely to be produced with the same frequency, duration, and so on, as when previously produced, the editing can be substantially similar to the editing previously applied. Instead of re-computing pulse frequency, duration, tolerance, etc. from scratch, resuming the previous editing can permit the editing to proceed quickly with less processing overhead.

The flow 900 includes providing information 970 to a gunshot detection system, from the gunshot sensor, that a fire alarm is occurring based on the strobe occurrence. The information can be used in modifying detection by other sensors based on the fire alarm occurring. As discussed above, a fire alarm can produce visual alerts in the form of strobes, and audio alerts in the form of alarms, codes, voice messages, and so on. The strobes include infrared light spectra and visible light spectra. By providing information to a gunshot detection system that a fire alarm is occurring, the gunshot detection system can be alerted that some infrared pulses should be attributed to strobe occurrences from a sequence of strobes. The gunshot detection system can begin detecting infrared pulses corresponding to strobe occurrences, editing strobe occurrences, etc. The flow 900 includes communicating between a fire alarm system and a gunshot detection system 980, including the gunshot sensor, so that the fire alarm system can provide a fire alarm notification to the gunshot detection system of a fire alarm, and can further evaluate that a gunshot did not occur based on the fire alarm notification. Such communication can be used to enhance the discrimination between fire alarm strobes and gunshot events. The communication can be used to indicate that editing is necessary, to initiate editing, to control editing (e.g. infrared pulse frequency, duration, tolerance, etc.), and so on. Various steps in the flow 900 may be changed in order, repeated, omitted, or the like without departing from the disclosed concepts. Various embodiments of the flow 900 can be included in a computer program product embodied in a non-transitory computer readable medium that includes code executable by one or more processors. Thus, disclosed embodiments comprise evaluating strobe occurrence, based on the infrared information and the acoustic information, and using the strobe occurrence to provide gunshot false alert detection.

Figure 10:
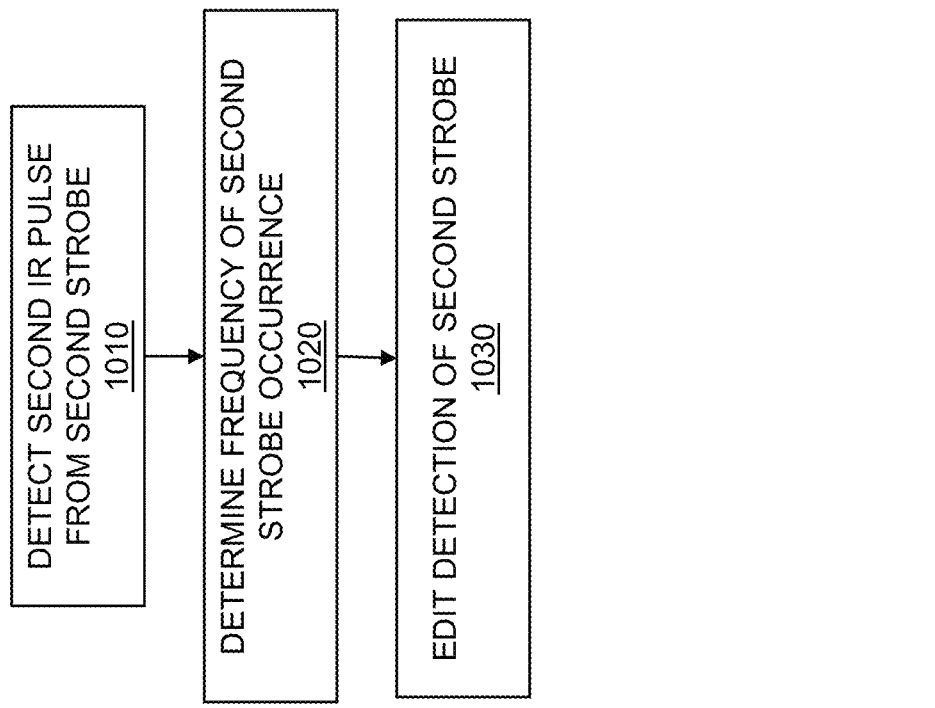
FIG. 10 is a flow diagram for second strobe evaluation.

FIG. 10 is a flow diagram for second strobe evaluation. The second strobe evaluation, where the second strobe can be collected within an indoor environment using a gunshot sensor device, supports cable-free indoor gunshot detection. The flow 1000 can continue from or be part of a previous flow. The flow 1000 includes detecting a second infrared pulse corresponding to a second sequence of strobes 1010. The second sequence can be from a second strobe source. In certain configurations, a given gunshot detector can have a line of sight to a plurality of fire alarms. Since the fire alarms typically include strobes and sounders, the flashing of the one or more fire alarm strobes can produce infrared pulses that can be similar to infrared pulses generated by muzzle flashes from firearms. As was the case for the first sequence of strobes, the second sequence of strobes can be detected by the infrared sensor included in a gunshot sensor. The infrared pulses that result from the second sequence of strobes can be similar to the infrared pulses from the first sequence of strobes.

The flow 1000 includes determining a frequency of strobe occurrence for the second sequence of strobes 1020. A time period between a first strobe occurrence for the second sequence of strobes and a second strobe occurrence for the second sequence of strobes can be determined. By inverting the time period, the frequency of strobe occurrence for the second sequence of strobes can be found. The duration of strobe occurrence for a given strobe occurrence for the second sequence of strobes can also be determined. The duration of strobe occurrence can be determined based on a time difference between pulse rise time and pulse fall time, the time difference between a 50-percent point in a pulse rise and a 50-percent point in a pulse fall, and so on.

The flow 1000 includes editing detection of a second set of further strobe occurrences 1030 based on the frequency of a second sequence of strobes. As was the case for the first sequence of strobe occurrences, editing detection can occur for the second sequence of strobes. Editing detection can edit out a time window for sensing by the infrared sensor of a gunshot sensor. During the time window that is edited out, the infrared sensor can ignore infrared pulses that can be associated with a second fire alarm strobe. The time window that is edited out can be less than or equal to four percent of a time period between strobe occurrences of the second sequence of strobes. In embodiments, the frequency of the first sequence of strobe occurrences and the frequency of the second sequence of strobe occurrences are substantially similar. When the frequencies for the strobe occurrences of the first and second sequences of strobes are substantially similar, the infrared sensor can interpret the two fire alarm pulses as one pulse, as a pulse wider than a pulse from a single strobe, and so on. In further embodiments, frequencies for the frequency of strobe occurrences and the frequency of the second sequence of strobes are different. When the frequencies for the strobe occurrences of the first and second sequences of strobes are different, then the two sequences of strobes can be detected, where each sequence of strobes has its own frequency and duration. The editing detection can edit out time windows for sensing by the infrared sensor based on the multiple strobe frequencies and the multiple strobe durations. This concept can be extended to three, four, or more strobe sources with corresponding frequencies, durations, and editing. Various steps in the flow 1000 may be changed in order, repeated, omitted, or the like without departing from the disclosed concepts. Various embodiments of the flow 1000 can be included in a computer program product embodied in a non-transitory computer readable medium that includes code executable by one or more processors.

Figure 11:
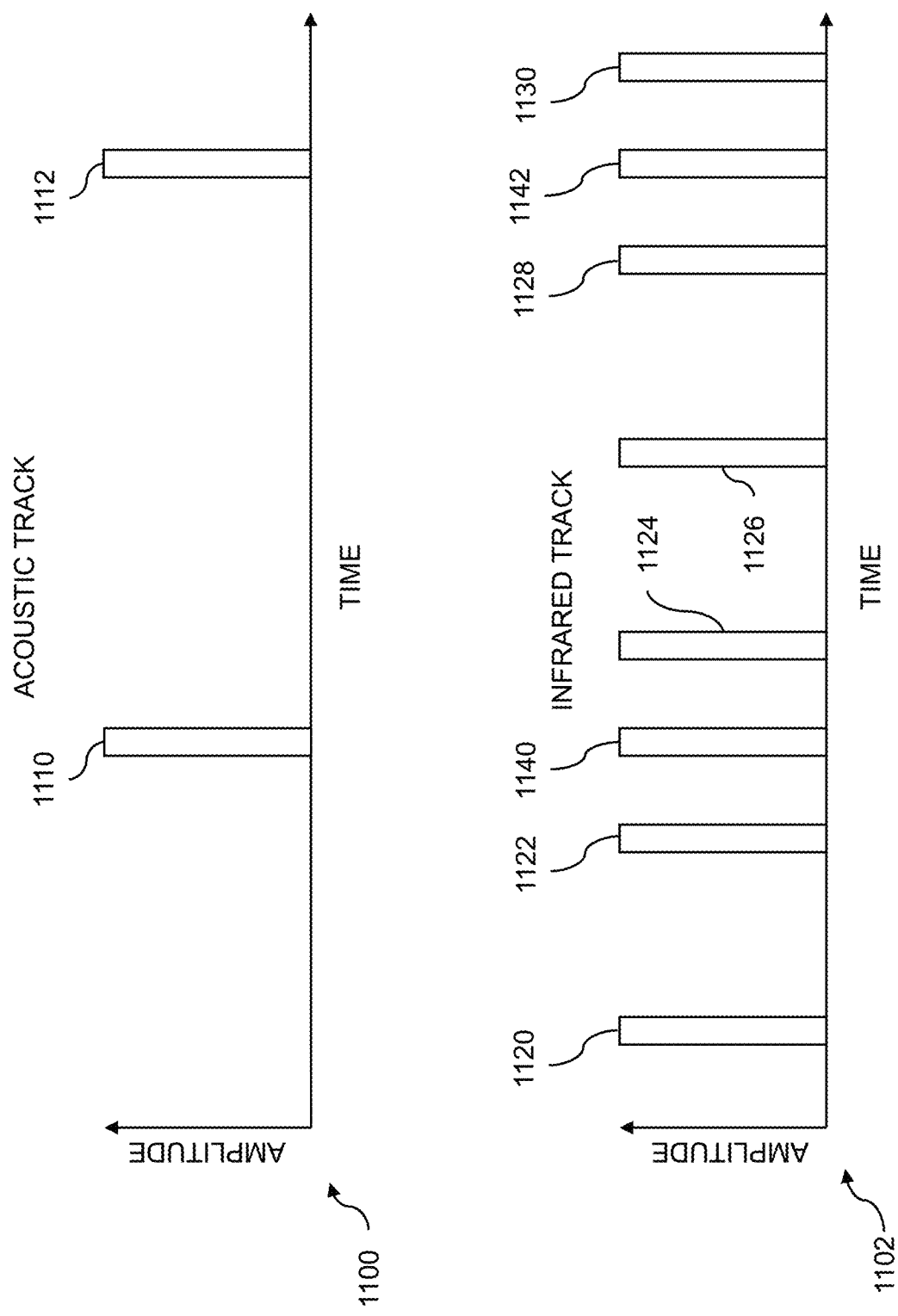
FIG. 11 shows acoustic and infrared tracks.

FIG. 11 shows acoustic and infrared tracks. As stated throughout, a gunshot sensor device includes an infrared sensor and an acoustic sensor. The gunshot sensor device supports cable-free indoor gunshot detection. In the event of a gunshot, the gunshot sensor device can detect both an infrared pulse and an acoustic pulse. The infrared sensor can detect an optical flash at the muzzle of a firearm, and the acoustic sensor can detect the muzzle blast. The acoustic sensor may also detect a shock wave when the projectile expelled from the firearm is traveling at supersonic velocities. For a gunshot event, both an infrared event and an acoustic event can occur. However, the acoustic event may only comprise a muzzle blast sound and not a shock wave. In some embodiments, only a silenced or highly attenuated sound occurs.

An example acoustic track 1100 is shown. In the event of one or more gunshot events, the acoustic sensor can detect high sound-pressure level waves 1110 and 1112. An impulse can result for each gunshot event that occurs. An infrared track 1102 is shown. Infrared pulses can result from a high intensity light strobe such as the strobe coupled to a fire alarm. Such pulses corresponding to a strobe occurrence can include pulses 1120, 1122, 1124, 1126, 1128, and 1130. Infrared pulses can result from an optical flash at the muzzle of a firearm. Such pulses corresponding to an optical flash can include pulses 1140 and 1142. The infrared track 1102 shows that infrared pulses alone might not distinguish between a strobe occurrence and an optical flash. A gunshot can be detected, while the fire alarm is occurring, based on information from both the infrared sensor and the acoustic sensor. As shown by the track 1100 and 1102, the overlap between the acoustic track pulses is associated with one or more gunshots, and the overlap between the infrared track pulses is associated with the gunshots. That is, the coincidence of the acoustic track pulses and the infrared track pulses can be used to detect a true gunshot. Conversely, when there is not a pulse on the acoustic track that corresponds to a pulse on the infrared track, then the source of the infrared pulse is likely not a gunshot. The acoustic sensor can sense an absence of an acoustic pressure wave corresponding to a gunshot during a timeframe of the strobe occurrence.

Figure 12:
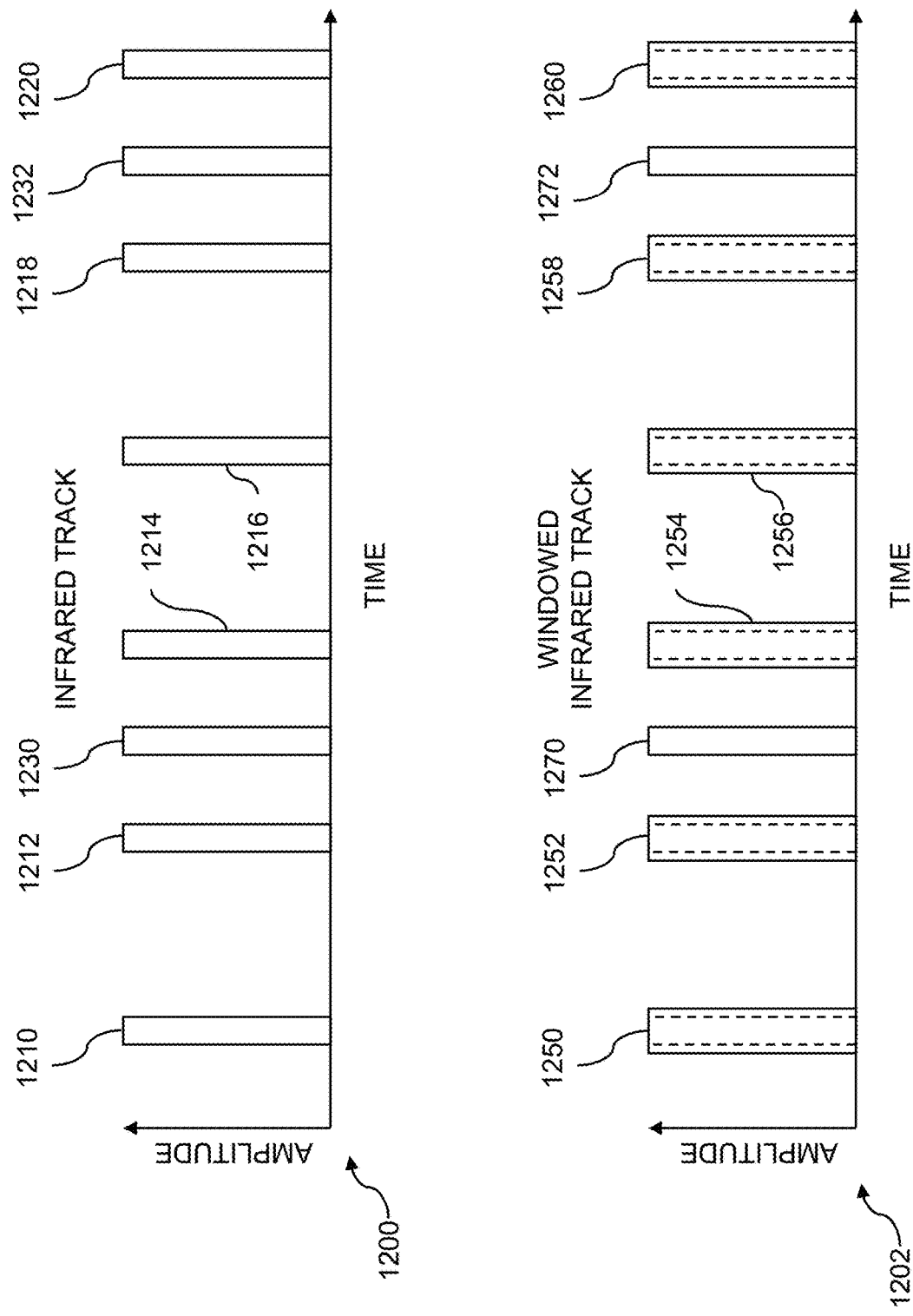
FIG. 12 is an example illustrating infrared and windowed infrared tracks.

FIG. 12 is an example illustrating infrared and windowed infrared tracks. Gunshot analysis can use a gunshot sensor device to collect acoustic information and infrared information. The gunshot sensor device can use cable-free communication to a network. The acoustic information is monitored to identify a high-intensity gunshot sound, and the high-intensity gunshot sound is matched to infrared information that was buffered. The gunshot sensor device is used to notify the network of a possible gunshot occurrence. Events other than gunshot occurrences can cause an infrared pulse to be detected. The detected infrared pulse can be determined to correspond to a strobe occurrence. A gunshot can be evaluated to have not occurred based on the strobe occurrence. A frequency of strobe occurrences can be determined, as can a duration for the strobes within the strobe occurrences. Editing detection can edit out a time window for sensing by the infrared sensor.

An infrared track 1200 is shown. As time progresses, a train of infrared pulses at the same amplitudes or at differing amplitudes can occur, where the pulses can correspond to strobe occurrences from a strobe. The strobe can be associated with an ongoing fire alarm. In the example 1200, using a gunshot sensor to detect an infrared pulse can detect an infrared pulse corresponding to a strobe. The strobe occurrence can be part of a sequence of strobes. Pulses 1210, 1212, 1214, 1216, 1218, and 1220 can correspond to such a sequence of strobes. An infrared pulse can correspond to one or more gunshots, represented by pulses 1230 and 1232. A frequency of strobe occurrences can be determined by detecting a train of pulses, determining the period between pulses, and inverting the period to find frequency. The duration of strobes within the strobe occurrences can be determined. The duration of strobes can be determined by calculating the time difference between the time at which a pulse rises and the time at which a pulse falls. Pulse duration can be measured between the 50-percent points of the rising waveform and the falling waveform, etc.

By determining a frequency and duration of strobe occurrences for a sequence of strobes, editing detection of the set of strobe occurrences can take place. The editing detection is based on the frequency and duration of the sequence of strobes. A windowed infrared track 1202 is shown. The editing detection edits out a time window for sensing by the infrared sensor. During the edited time window, pulses resulting from infrared signals detected by the gunshot detector can be ignored. By ignoring signals, processing and analysis resources can be reserved for analyzing other signals that have not yet been identified, or signals that have been identified and are being tracked. The edited time window can be less than or equal to four percent of a time period between strobe occurrences. The small edited time window can avoid missing infrared pulses that might actually be gunshots. Based on the frequency of strobe occurrence for the sequence of strobes, or pulses, 1210, 1212, 1214, 1216, 1218, and 1220, the strobes from the sequence can be edited as strobes, represented by pulses 1250, 1252, 1254, 1256, 1258, and 1260. Since the infrared pulses 1230 and 1232 can correspond to gunshot events, the pulses 1230 and 1232 can be left unedited as pulses 1270 and 1272, respectively. In some embodiments, the fire alarm(s) communicate an activated status to a gateway, which then conveys the information to the gunshot sensors. The communication can include information pertaining to the fire alarm buzzer and/or strobe pattern. In response, the gunshot sensors can perform the aforementioned windowing based on the information conveyed from the fire alarm(s).

Figure 13:
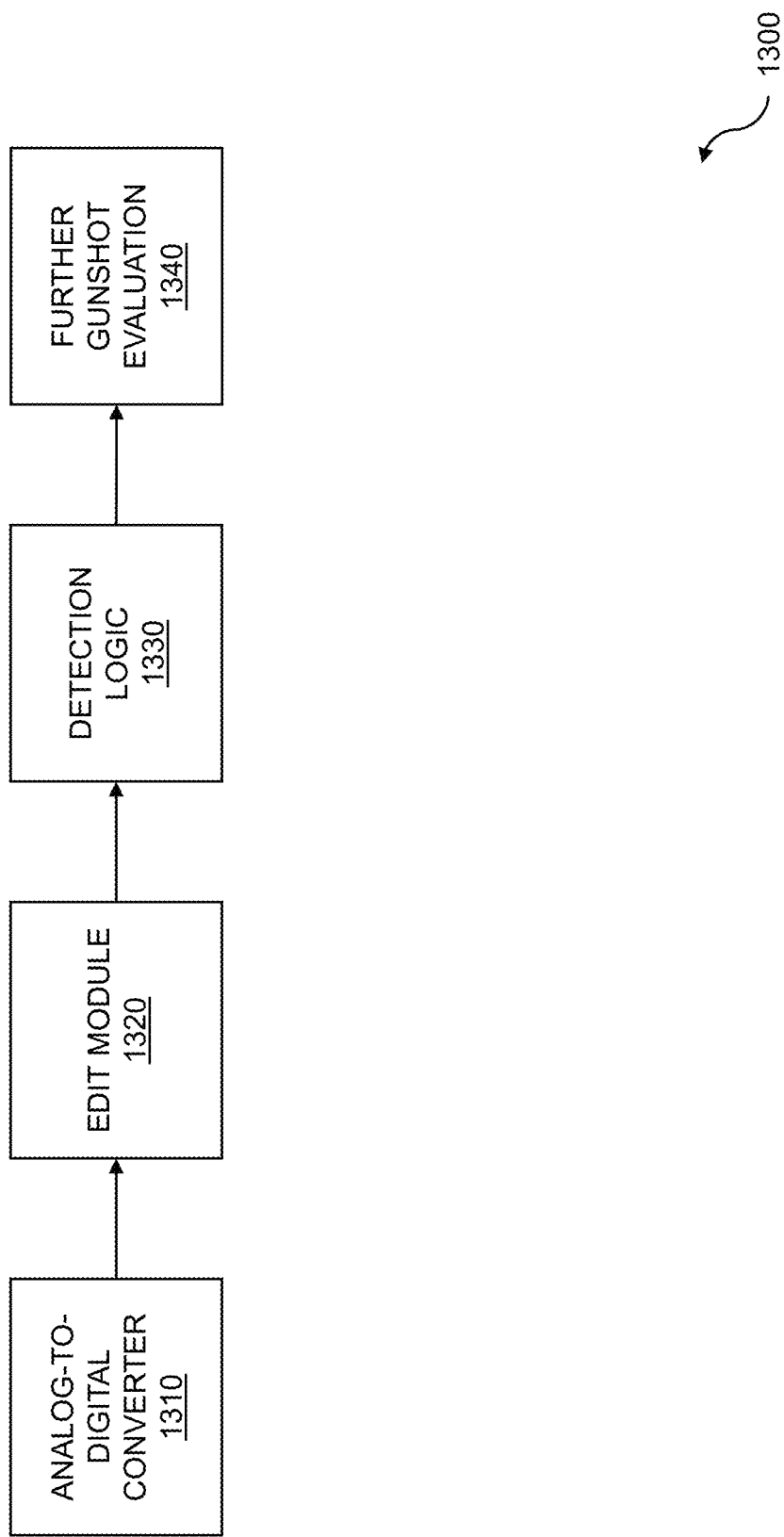
FIG. 13 shows signal editing components.

FIG. 13 shows signal editing components. Gunshot detection analysis can use a gunshot sensor device to detect an infrared pulse. The gunshot sensor device can include an infrared sensor and an acoustic sensor. Gunshot detection analysis supports cable-free indoor gunshot detection. The example 1300 shows signal editing components for indoor gunshot detection analysis with an ongoing fire alarm. The signal editing components can be included in a gunshot sensor or can be external to the gunshot sensor. The signal editing components can be implemented in hardware, software, or a combination thereof. The signal editing components can include a processor and software to configure the processor. The signal editing components can be implemented with integrated circuits, can be cloud-based, and so on. The gunshot sensor can include an analog-to-digital converter 1310 and logic to perform gunshot detection, and the analog-to-digital converter 1310 can be interposed between the infrared sensor and the logic. The logic can be edit logic. The analog-to-digital converter can operate on the pulses received from the infrared sensor or sensors and can operate on the impulses received from the acoustic sensor or sensors. The analog-to-digital converter can perform various operations including pulse detection, filtering, determining pulse frequency, determining pulse duration, and so on.

The analog-to-digital converter can be coupled to an edit module 1320. As previously stated, editing can include editing detection, where editing can edit out a time window for sensing by the infrared sensor. The editing can be based on a frequency of strobe occurrences, on a duration of strobes within the strobe occurrences, and so on. The editing detection can be accomplished between the analog-to-digital converter and the logic to perform gunshot detection. The signal editing components can include detection logic 1330. The detection logic 1330 can be coupled to the edit module 1320. The logic to perform gunshot detection can include a processor, as well as software to configure the processor to perform the gunshot detection. The gunshot detection can determine that an infrared pulse corresponds to a strobe occurrence and can evaluate whether a gunshot did or did not occur. The detection technique can be edited. The editing detection can be accomplished by the processor based on software to configure the processor to perform the editing. The editing detection can include loading software, where the software can be coded to implement a variety of algorithms, heuristics, and so on. The editing can be performed before the gunshot detection. The editing can include filtering, signal shaping, scaling, attenuation, discrimination, antialiasing, and so on. The signal editing components can include further gunshot evaluation 1340. The further gunshot evaluation component 1340 can be coupled to the detection logic 1330. The further gunshot evaluation can include detecting a gunshot with an ongoing fire alarm, detecting a gunshot with multiple ongoing fire alarms, detecting multiple gunshots, etc. The further gunshot evaluation can include identifying weapons, identifying shooters, tracking shooters, and so on. Various embodiments of the example 1300 illustrating signal editing components can be included in a computer program product embodied in a non-transitory computer readable medium that includes code executable by one or more processors.

Figure 14:
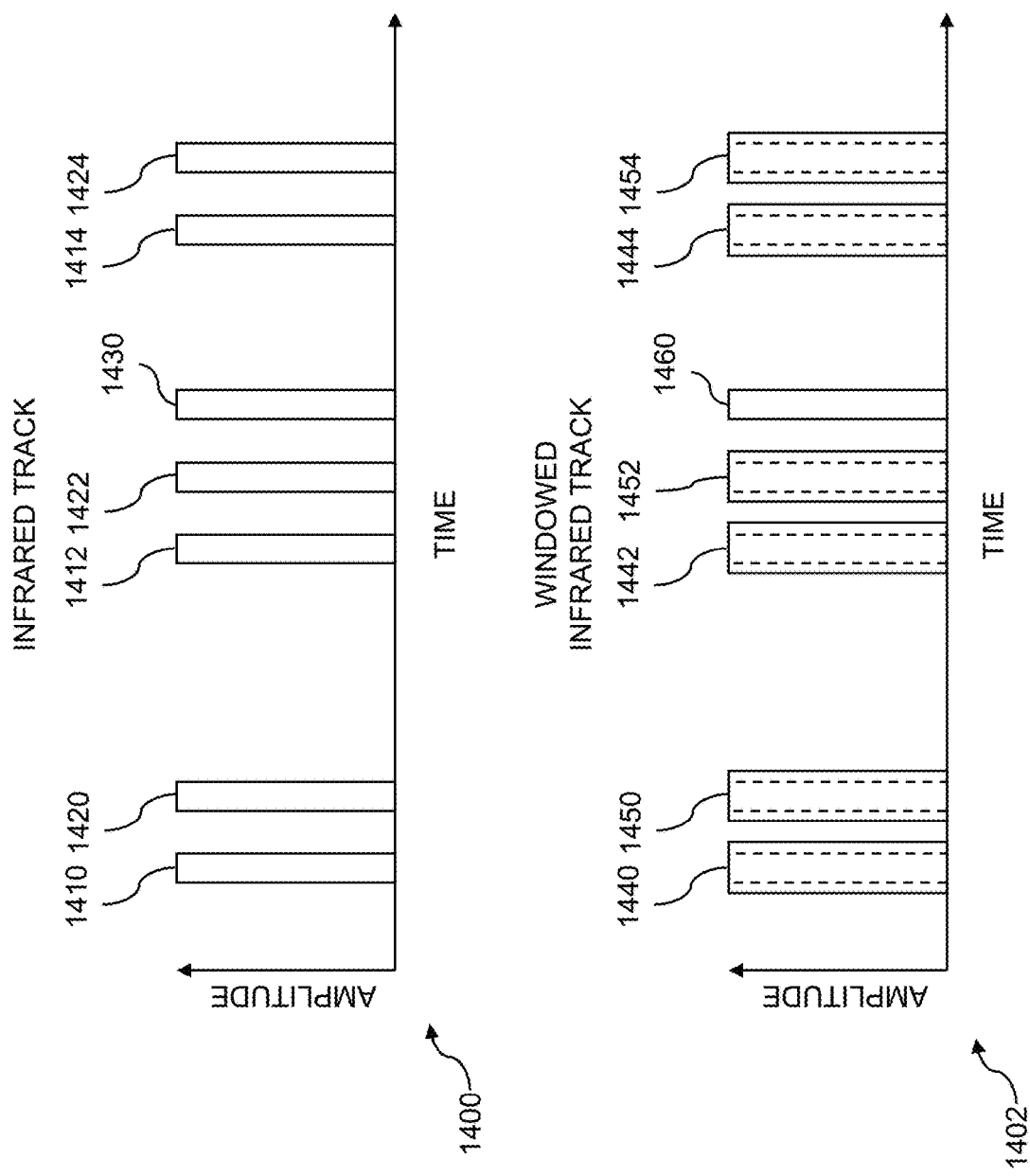
FIG. 14 illustrates editing for multiple strobes.

FIG. 14 illustrates editing for multiple strobes. Various scenarios such as the presence of a fire alarm or other periodic alert devices can cause multiple strobes to be detected by a gunshot sensor device. The gunshot sensor device can include one or more infrared sensors or detectors. When multiple strobes are present, editing detection can edit out multiple time windows, including time windows for sensing by the infrared sensor. The editing for multiple strobes supports cable-free indoor gunshot detection. An infrared track 1400 is shown. As time progresses, a train of infrared pulses at the same amplitudes or at differing amplitudes can occur, and these pulses can correspond to strobe occurrences from one or more strobes. In track 1400, using a gunshot sensor to detect an infrared pulse can detect a second infrared pulse corresponding to a second sequence of strobes. Pulses 1410, 1412, and 1414 can correspond to strobe occurrences of a first strobe, and pulses 1420, 1422, and 1424 can correspond to strobe occurrences of a second strobe. In practice, any number of strobe occurrences can be present. An infrared pulse can correspond to a gunshot, represented by pulse 1430. As was the case for a single strobe, where a frequency of strobe occurrences for the first sequence of strobes was determined, a frequency of strobe occurrences for the second sequence of strobes can also be determined. The results of determining a frequency of strobe occurrences, for a second sequence of strobes, can be editing detection of a second set of further strobe occurrences, based on the frequency of second sequence of strobes. A windowed infrared track 1402 is shown. Based on the frequency of strobe occurrence for the first sequence of strobes, represented by pulses 1410, 1412, and 1414, the strobes from the first sequence can be edited to pulses 1440, 1442, and 1444, respectively. Similarly, based on the frequency of strobe occurrence for the second sequence of strobes, represented by pulses 1420, 1422, and 1424, the strobes from the second sequence can be edited to pulses 1450, 1452, and 1454, respectively. Since the infrared pulse 1430 can correspond to a gunshot event, the pulse 1430 can be left unedited as pulse 1460.

Editing detection includes editing out a time window for sensing by the infrared sensor. Editing out a time window can include editing out infrared pulses corresponding to the first sequence of strobe occurrences. Editing detection can include editing out a time window for sensing by the infrared sensor infrared pulses which correspond to the second sequence of strobe occurrences. The editing detection can be dependent not only on the frequencies of the first sequence of strobe occurrences and the second sequence of strobe occurrences, but also on the durations of each sequence of strobe occurrences and the separation between the two sequences. Frequencies for the strobe occurrences and the second sequence of strobes can be substantially similar. Differentiating between the two sequences can be complex, since it can be difficult to differentiate between the beginning of one pulse in one sequence and the ending of another pulse in another sequence. When the pulse frequencies are substantially similar, the editing can be accomplished by increasing the value of the duration for strobes within the first sequence of strobe occurrences, such that the increased duration value covers both the first sequence of strobe occurrences and the second sequence of strobe occurrences. However, frequencies for the strobe occurrences and the second sequence of strobes can also be different. In this latter case, detection of strobe occurrences of the first sequence of strobes and detection of strobe occurrences of the second sequence of strobes can differentiate between the two sequences of strobes. The widths of the editing windows can thus be determined individually based on the durations of the two sequences of pulses.

Figure 15:
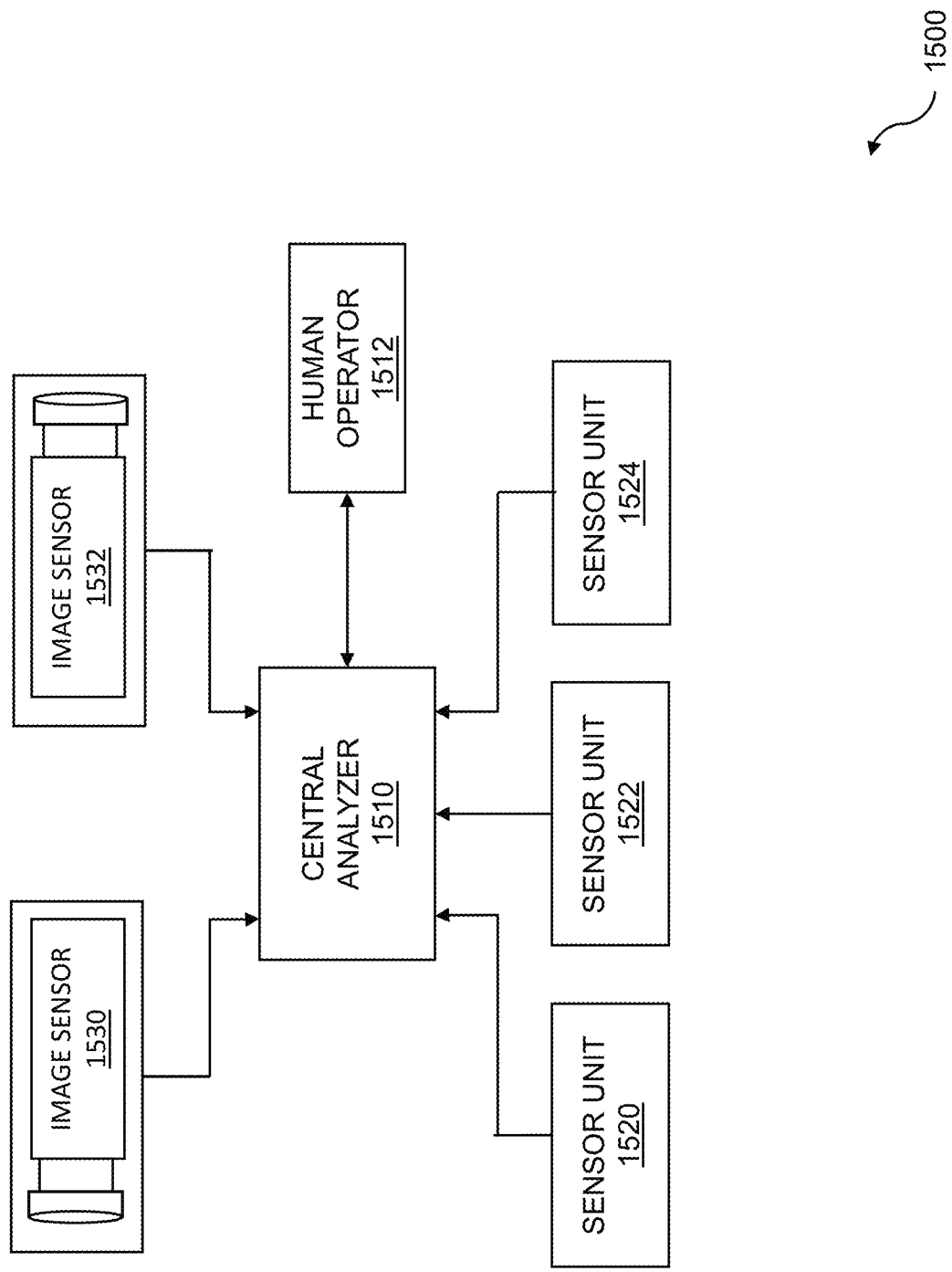
FIG. 15 is an example system illustrating sensors, cameras, and a central analyzer.

FIG. 15 is an example system illustrating sensors, cameras, and a central analyzer. The sensors, cameras, central analyzer, and other components can be used for cable-free indoor gunshot detection. Indoor gunshot detection can be based on infrared information and acoustic information, where both types of information can be obtained within an indoor environment using a gunshot sensor device. The acoustic information can be monitored to identify a high-intensity gunshot sound, and the high-intensity gunshot sound can be matched to infrared information that was buffered. A network can be notified of a possible gunshot occurrence by the gunshot sensor device. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. Sensors, cameras, and a central analyzer can be used for indoor gunshot detection with components of a system 1500. A central analyzer 1510 can be used for detecting a gunshot in the indoor environment. The central analyzer can control the sensor units and image sensors. The central analyzer can be used to detect a gunshot, engage video collection, and perform video analytics. The central processor can interact with a human operator 1512. The human operator can interact with the central analyzer to provide oversight. The human operator can tag a person of interest. The tagging by the human operator can be used along with video analytics for tracking the person of interest. The central analyzer can be coupled to a plurality of gunshot sensor units 1520, 1522, and 1524, a plurality of image sensors 1530 and 1532, and so on. The central analyzer can obtain infrared information and acoustic information from the sensor units. The central analyzer can be coupled to image sensors 1530 and 1532. The image sensors can be engaged by the central analyzer. The image sensors that can be used can be video cameras, still cameras, or other digital image collection systems and techniques. The central analyzer can perform video analytics, where the video analytics utilize image classifiers. The image classifiers can be used to identify a gun type. A suspected shooter can be identified based on the video analytics. As mentioned above, with oversight from the human operator 1512, where the operator can tag a person of interest, tracking of the person of interest can be conducted using video analytics performed by the central analyzer.

Figure 16:
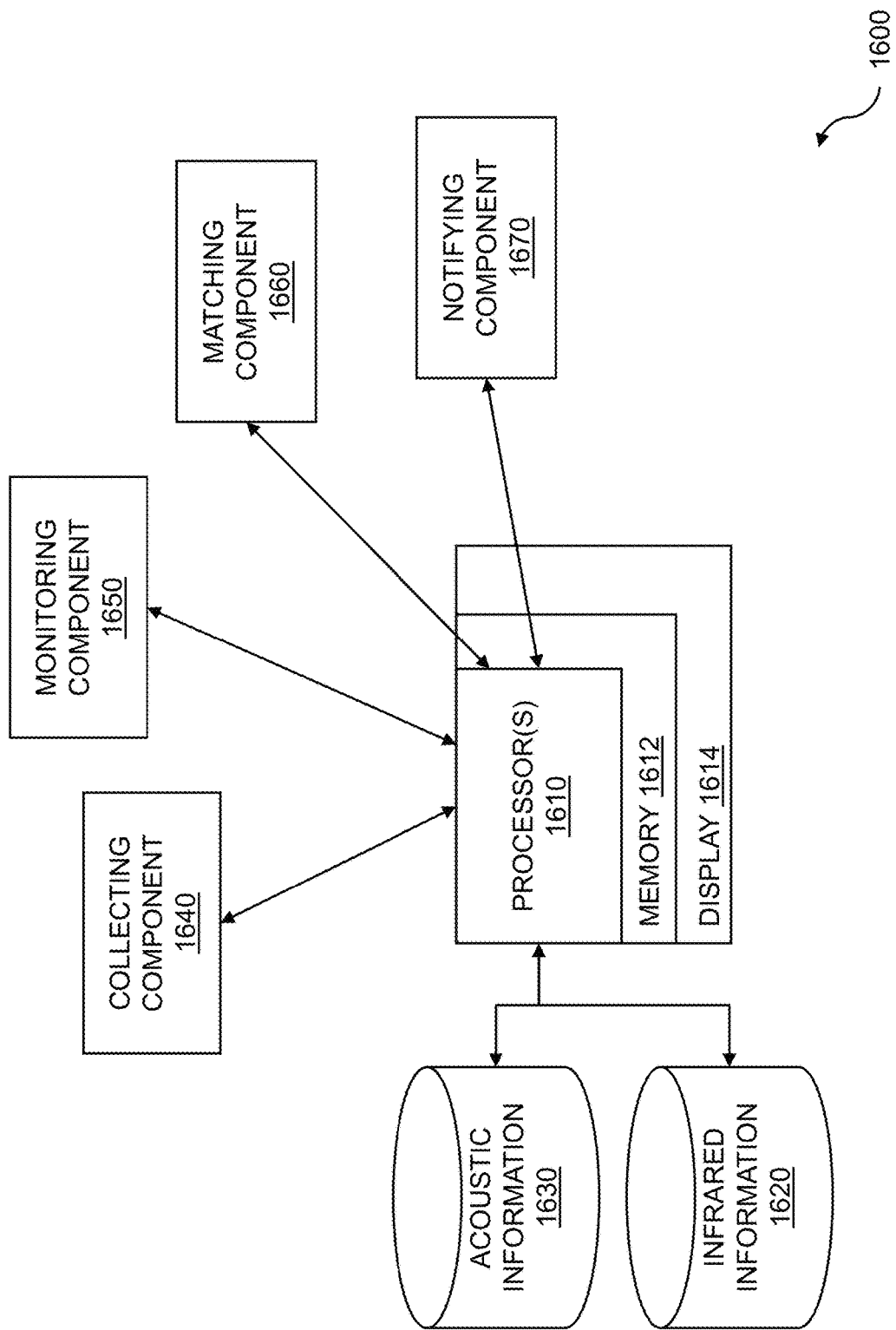
FIG. 16 is a system diagram for cable-free indoor gunshot detection.

FIG. 16 is a system diagram for cable free indoor gunshot detection. The system 1600 can include a plurality of gunshot sensor units used for gunshot analysis, wherein each of the plurality of gunshot sensor units comprises: an infrared (IR) sensor contained in a wall-mountable housing, wherein the infrared sensor collects infrared data and provides it to a buffering device connected to the infrared sensor, wherein the buffering device enables infrared monitoring; an acoustic sensor contained in the wall-mountable housing, wherein the acoustic sensor collects high-intensity sounds and enables acoustic monitoring; a cable-free communication device contained in the wall-mountable housing; a processor contained in the wall-mountable housing, wherein the processor is connected to the acoustic sensor, the buffering device, and the cable-free communication device, wherein the processor controls operation of the gunshot analysis apparatus and enables a low-power collecting and monitoring mode; and a battery, wherein the battery is connected to provide power to the devices of the gunshot analysis apparatus, and wherein the battery is contained within, on, or next to the wall-mountable housing. IR signal information received by the IR sensor can include spurious high-power IR information due to a strobe from a fire alarm. The system 1600 can include filtering, where the filtering includes spurious infrared information filtering. The spurious information filtering can include fire alarm filtering. The system 1600 can filter high-intensity infrared information from an ongoing fire alarm strobe light. The system 1600 further includes spurious infrared information which filters high-level ambient lighting. The system 1600 can include one or more processors 1610 coupled to a memory 1612 which can store and retrieve instructions and data, and a display 1614. The display can be used to show acoustic information, infrared information, matching information, and so on. The display can be used to show notification information.

The system 1600 can include a collection of infrared information 1620. The infrared information can include IR information collected using a gunshot sensor within the indoor environment. The IR information can include IR information collected from a potential gunshot event, spurious IR information from high-intensity IR pulses such as from a fire alarm, lightning flashes, high-level ambient light, etc. The IR information can include IR test information, IR calibration information, and the like. The system 1600 can include a collection of acoustic information 1630. The acoustic information can include acoustic information collected using the gunshot sensor within the indoor environment. The acoustic event can include acoustic information collected from a potential gunshot event, fireworks, an explosion, a high intensity acoustic event such as an alarm or car horn, and the like. The acoustic information can include other acoustic information such as acoustic signatures for various types of acoustic events, acoustic test information, acoustic calibration information, and so on.

The system 1600 can include a collecting component 1640. The collecting of the infrared information 1620, or the collecting of the acoustic information 1630, can occur using the one or more processors 1610, or can occur using other processors. The collecting of the infrared information 1620 or the collecting of the acoustic information 1630 can be accomplished using a cable-free access to a wired or wireless computer network, a wired or wireless sensor network, the Internet, and so on. The acoustic information 1630 can be collected within an indoor environment using a gunshot sensor device, where the gunshot sensor device can use cable-free communication to a network and where the gunshot sensor device can be powered by a battery. The infrared information 1620 can be collected within the indoor environment using the gunshot sensor device, where the infrared information can be buffered within the gunshot sensor device. The infrared information or the acoustic information can be collected from a plurality of infrared sensors and acoustic transducers, respectively. The infrared sensors can be pointed to cover different fields of view, and the acoustic sensors can also be pointed in different directions. The acoustic sensors can be attenuated. The acoustic sensors can be configured so that they cannot detect voices.

The system 1600 can include a monitoring component 1650. The monitoring component can use the gunshot sensor device to monitor the acoustic information to identify a high-intensity gunshot sound. The monitoring component can include hardware or software for monitoring acoustic information from the gunshot sensor or infrared information from the gunshot sensor for a gunshot event. The monitoring can include determining large amplitude acoustic information, large amplitude infrared information, or both. The monitoring can include determining periodic infrared information such as may result from a fire alarm or other strobed alert. The system 1600 can include a matching component 1660. The matching component can match, using the gunshot sensor device, the high-intensity gunshot sound to the infrared information that was buffered. The matching can be performed in hardware or software. The matching can be based on a comparison of the collected information to known signature data from firearm discharge. For example, a library of various signatures from firearms of different types can be stored within system 1600. As part of matching, the matching component 1660 can compare acquired information from gunshot sensor device to data in the library to determine if the acquired information pertains to a gunshot, and possibly to indicate a firearm model and/or type that was used to create the gunshot. The matching can include making a correspondence between the gunshot sound and an infrared event that occurred in time before the gunshot sound. The infrared event can be detected in time before the gunshot sound, as light travels faster than sound. Further, the sound may reverberate off hard surfaces within the indoor environment causing multiple acoustic information detections due to multipath collection.

The system 1600 can include a notifying component 1670. The notifying component can use the gunshot sensor device to notify the network of a possible gunshot occurrence. The notifying of the network can be based on cable-free techniques, where the cable-free communication to a network can include wireless communication. The network can include a wireless network such as a computer network based on Wi-Fi™, a local network based on Bluetooth™, Zigbee™, infrared, or other wireless techniques or standards. The network can include a wired network such as the Internet or other computer network, a hybrid network based on wireless and wired techniques, and so on. The notifying can be based on an analysis of the high-intensity gunshot sound and the infrared event that was matched. In embodiments, the notifying can include a fully operational mode of the gunshot sensor device. The notifying can include using a cable-free technique to send an alert or notification from the gunshot sensor device to a wired device such as a gateway device.

The system 1600 can include a computer system for gunshot analysis comprising: a memory which stores instructions; one or more processors attached to the memory wherein the one or more processors, when executing the instructions which are stored, are configured to: collect acoustic information within an indoor environment using a gunshot sensor device, wherein the gunshot sensor device uses cable-free communication to a network and wherein the gunshot sensor device is powered by a battery; collect infrared information within the indoor environment using the gunshot sensor device, wherein the infrared information is buffered within the gunshot sensor device; monitor, using the gunshot sensor device, the acoustic information to identify a high-intensity gunshot sound; match, using the gunshot sensor device, the high-intensity gunshot sound to the infrared information that was buffered, wherein the matching includes making a correspondence between the gunshot sound to an infrared event that occurred in time before the gunshot sound; and notify, using the gunshot sensor device, the network, of a possible gunshot occurrence, wherein the notifying is based on an analysis of the high-intensity gunshot sound and the infrared event that was matched.

The system 1600 can include a computer program product embodied in a non-transitory computer readable medium for gunshot analysis, the computer program product comprising code which causes one or more processors to perform operations of: collecting acoustic information within an indoor environment using a gunshot sensor device, wherein the gunshot sensor device uses cable-free communication to a network and wherein the gunshot sensor device is powered by a battery; collecting infrared information within the indoor environment using the gunshot sensor device, wherein the infrared information is buffered within the gunshot sensor device; monitoring, using the gunshot sensor device, the acoustic information to identify a high-intensity gunshot sound; matching, using the gunshot sensor device, the high-intensity gunshot sound to the infrared information that was buffered, wherein the matching includes making a correspondence between the gunshot sound and an infrared event that occurred in time before the gunshot sound; and notifying, using the gunshot sensor device, the network, of a possible gunshot occurrence, wherein the notifying is based on an analysis of the high-intensity gunshot sound and the infrared event that was matched.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Disclosed embodiments are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for gunshot analysis comprising:
    collecting acoustic information within an indoor environment using a gunshot sensor device, wherein the gunshot sensor device uses cable-free communication to a network and wherein the gunshot sensor device is powered by a battery;
    collecting infrared information within the indoor environment using the gunshot sensor device, wherein the infrared information is buffered within the gunshot sensor device, wherein the infrared information that is buffered uses a low-power infrared information buffer and a high-power infrared information buffer;
    monitoring, using the gunshot sensor device, the acoustic information to identify a high-intensity gunshot sound, wherein the collecting and the monitoring comprise a low-power mode of the gunshot sensor device;
    matching, using the gunshot sensor device, the high-intensity gunshot sound to the infrared information that was buffered, wherein the matching includes making a correspondence between the gunshot sound and an infrared event that occurred in time before the gunshot sound; and
    notifying, using the gunshot sensor device, the network, of a possible gunshot occurrence, wherein the notifying is based on an analysis of the high-intensity gunshot sound and the infrared event that was matched.

2. The method of claim 1 wherein the analysis is performed by the gunshot sensor device.

3. The method of claim 1 wherein the battery of the gunshot sensor device occupies less than 10 cubic inches of volume.

4. The method of claim 1 wherein the gunshot sensor device and the battery are co-located in one housing.

5. The method of claim 1 wherein the low-power infrared information buffer enables gunshot event confirmation.

6. The method of claim 5 wherein the high-power infrared information buffer enables spurious infrared information filtering.

7. The method of claim 6 wherein the spurious infrared information filtering includes fire alarm filtering.

8. The method of claim 1 further comprising periodic excursions to a higher-power mode by the gunshot sensor device, wherein the higher-power mode enables cable-free communication, to the network, of health data to a gunshot detection gateway.

9. The method of claim 1 wherein the matching comprises a medium-power mode of the gunshot sensor device.

10. The method of claim 1 wherein the notifying comprises a fully operational mode of the gunshot sensor device.

11. The method of claim 1 further comprising moving from the low-power mode to a higher power mode to facilitate cable-free communication to the network.

12. The method of claim 11 further comprising performing additional analysis by the gunshot sensor device after the analysis of the high-intensity gunshot sound and the infrared event that was matched.

13. The method of claim 1 further comprising buffering the acoustic information.

14. The method of claim 13 wherein the acoustic information that is buffered uses a low-power acoustic information buffer and a high-power acoustic information buffer.

15. The method of claim 14 wherein the low-power acoustic information buffer enables gunshot event detection.

16. The method of claim 15 wherein the high-power acoustic information buffer enables spurious information filtering.

17. The method of claim 1 wherein the cable-free communication to a network includes one or more powered communication relay devices.

18. The method of claim 1 wherein the cable-free communication to a network provides data to a gunshot detection gateway.

19. The method of claim 18 wherein the gunshot detection gateway corroborates an actual gunshot occurrence based on data communicated from one or more additional gunshot sensor devices.

20. The method of claim 19 wherein the one or more additional gunshot sensor devices provides acoustic information or infrared information.

21. The method of claim 18 wherein the gunshot detection gateway provides control information back to the gunshot sensor device using the cable-free communication.

22. An apparatus for gunshot analysis comprising:
an infrared sensor contained in a wall-mountable housing, wherein the infrared sensor collects infrared data and provides it to a buffering device connected to the infrared sensor, wherein the buffering device enables infrared monitoring;
an acoustic sensor contained in the wall-mountable housing, wherein the acoustic sensor collects high-intensity sounds and enables acoustic monitoring;
a cable-free communication device contained in the wall-mountable housing;
a processor contained in the wall-mountable housing, wherein the processor is connected to the acoustic sensor, the buffering device, and the cable-free communication device, wherein the processor controls operation of the gunshot analysis apparatus and enables a low-power collecting and monitoring mode of the infrared sensor; and
a battery, wherein the battery is connected to provide power to the devices of the gunshot analysis apparatus, and wherein the battery is contained within, on, or next to the wall-mountable housing.

23. A computer system for gunshot analysis comprising:
a memory which stores instructions;
one or more processors attached to the memory wherein the one or more processors, when executing the instructions which are stored, are configured to:
collect acoustic information within an indoor environment using a gunshot sensor device, wherein the gunshot sensor device uses cable-free communication to a network and wherein the gunshot sensor device is powered by a battery;
collect infrared information within the indoor environment using the gunshot sensor device, wherein the infrared information is buffered within the gunshot sensor device using a low-power mode of the gunshot sensor device;
monitor, using the gunshot sensor device, the acoustic information to identify a high-intensity gunshot sound using the low-power mode of the gunshot sensor device;
match, using the gunshot sensor device, the high-intensity gunshot sound to the infrared information that was buffered, wherein the matching includes making a correspondence between the gunshot sound and an infrared event that occurred in time before the gunshot sound; and
notify, using the gunshot sensor device, the network, of a possible gunshot occurrence, wherein the notifying is based on an analysis of the high-intensity gunshot sound and the infrared event that was matched.

* * * * *